(12) United States Patent
Prager et al.

(10) Patent No.: US 11,027,843 B2
(45) Date of Patent: Jun. 8, 2021

(54) SYSTEM AND METHODS FOR AUTOMATIC PAYLOAD PICKUP BY UAV

(71) Applicant: Wing Aviation LLC, Mountain View, CA (US)

(72) Inventors: Andre Prager, Sunnyvale, CA (US); Trevor Shannon, Mountain View, CA (US); Zhefei Li, San Mateo, CA (US)

(73) Assignee: Wing Aviation LLC, Mountain View, CA (US)

( * ) Notice: Subject to any disclaimer, the term of this patent is extended or adjusted under 35 U.S.C. 154(b) by 785 days.

(21) Appl. No.: 15/847,370

(22) Filed: Dec. 19, 2017

(65) Prior Publication Data

US 2019/0185162 A1  Jun. 20, 2019

(51) Int. Cl.
| | | |
|---|---|---|
| *B64D 1/12* | (2006.01) |
| *B64D 1/08* | (2006.01) |
| *B64C 39/02* | (2006.01) |
| *G05D 1/10* | (2006.01) |
| *B64D 1/22* | (2006.01) |
| *B64D 1/10* | (2006.01) |
| *B64F 1/32* | (2006.01) |

(52) U.S. Cl.
CPC .............. *B64D 1/08* (2013.01); *B64C 39/024* (2013.01); *B64D 1/10* (2013.01); *B64D 1/12* (2013.01); *B64D 1/22* (2013.01); *B64F 1/32* (2013.01); *G05D 1/101* (2013.01); *B64C 2201/128* (2013.01); *B64C 2201/141* (2013.01); *B64C 2201/146* (2013.01); *B64C 2201/18* (2013.01)

(58) Field of Classification Search
CPC ... B64D 1/08; B64D 1/10; B64D 1/12; B64D 1/22; B64F 1/32; B64C 39/024; B64C 2201/128; G05D 1/101
See application file for complete search history.

(56) References Cited

U.S. PATENT DOCUMENTS

| | | | |
|---|---|---|---|
| 8,876,057 B2 | 11/2014 | Alber et al. | |
| 8,899,903 B1 | 12/2014 | Saad et al. | |
| 9,174,733 B1* | 11/2015 | Burgess | B64D 1/12 |
| 9,321,531 B1* | 4/2016 | Takayama | B64C 39/024 |
| 9,384,668 B2 | 7/2016 | Raptopoulos et al. | |
| 9,573,684 B2 | 2/2017 | Kimchi et al. | |
| 9,580,173 B1* | 2/2017 | Burgess | B64D 1/22 |

(Continued)

FOREIGN PATENT DOCUMENTS

| | | |
|---|---|---|
| WO | 2016/124658 A1 | 8/2016 |
| WO | 2017120620 A1 | 7/2017 |

OTHER PUBLICATIONS

International Search Report and Written Opinion dated Mar. 19, 2019, issued in corresponding International Application No. PCT/US2018/065720, 16 pages.

*Primary Examiner* — Brian M O'Hara
*Assistant Examiner* — Keith L Dixon
(74) *Attorney, Agent, or Firm* — McDonnell Boehnen Hulbert & Berghoff LLP

(57) ABSTRACT

A payload retrieval system including a UAV having a payload receptacle positioned within the UAV, a payload coupling apparatus positioned within the payload receptacle, a tether having a first end secured within the UAV and a second end attached to the payload coupling apparatus, and a payload guiding member positioned on an underside of the UAV for guiding at least part of a payload into the payload receptacle during retrieval of a payload.

20 Claims, 21 Drawing Sheets

(56) References Cited

U.S. PATENT DOCUMENTS

| | | |
|---|---|---|
| 9,688,404 B1 | 6/2017 | Buchmueller et al. |
| 9,751,627 B2 | 9/2017 | Bernhardt |
| 10,049,589 B1* | 8/2018 | Boyd .................. H04N 13/204 |
| 10,315,764 B2 | 6/2019 | Shannon et al. |
| 10,604,252 B2* | 3/2020 | Blake et al. .......... B64C 39/024 |
| 2016/0023761 A1* | 1/2016 | McNally .................. H02G 1/02 |
| | | 29/407.01 |
| 2016/0107750 A1* | 4/2016 | Yates .................... B64C 39/024 |
| | | 244/2 |
| 2016/0137311 A1* | 5/2016 | Peverill ................... B64C 25/68 |
| | | 244/110 C |
| 2017/0073071 A1 | 3/2017 | Salzmann et al. |
| 2017/0121023 A1 | 5/2017 | High et al. |
| 2017/0253335 A1 | 9/2017 | Thompson et al. |
| 2017/0267347 A1 | 9/2017 | Rinaldi et al. |
| 2017/0328814 A1* | 11/2017 | Castendyk ............. G01N 33/18 |
| 2017/0355460 A1 | 12/2017 | Shannon et al. |
| 2018/0029845 A1 | 2/2018 | Wrycza |

* cited by examiner

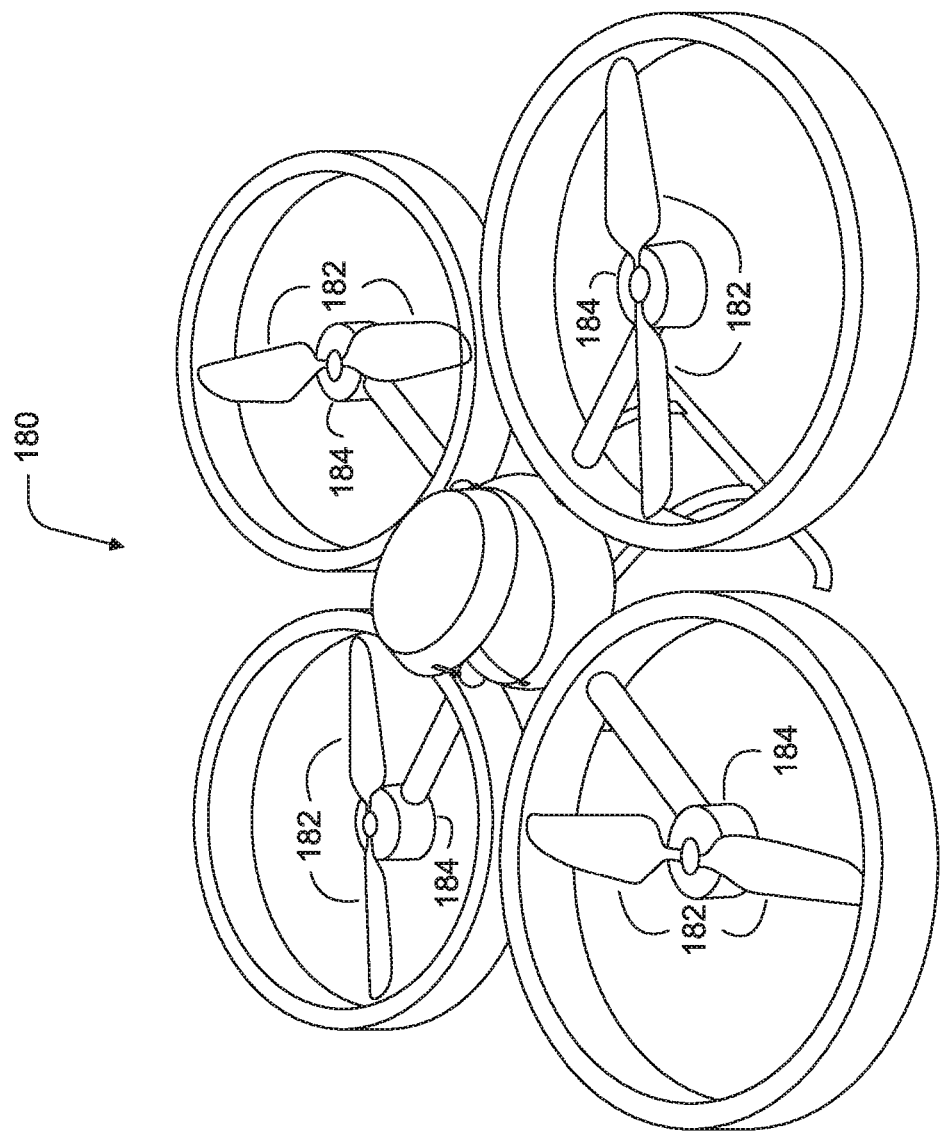

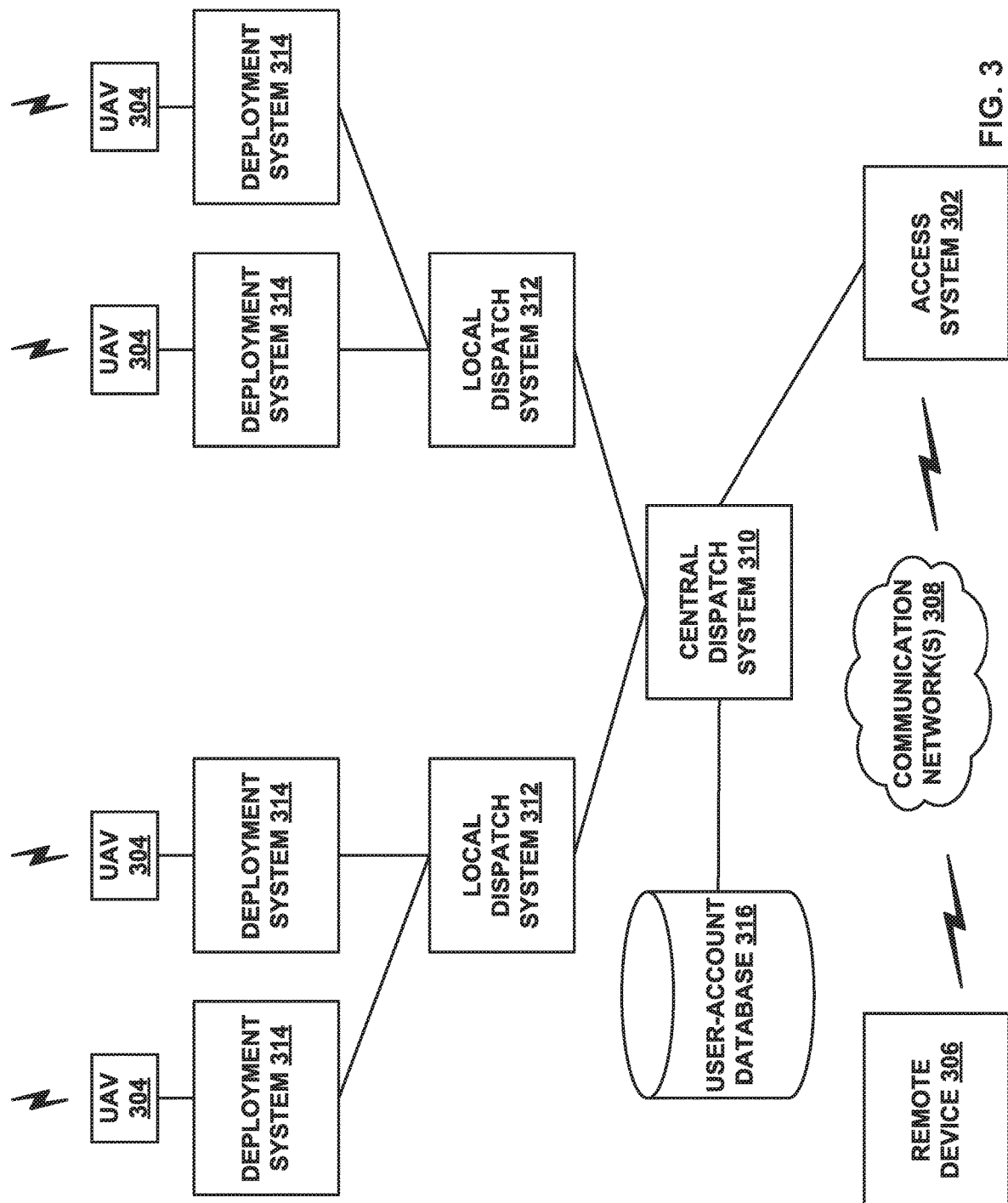

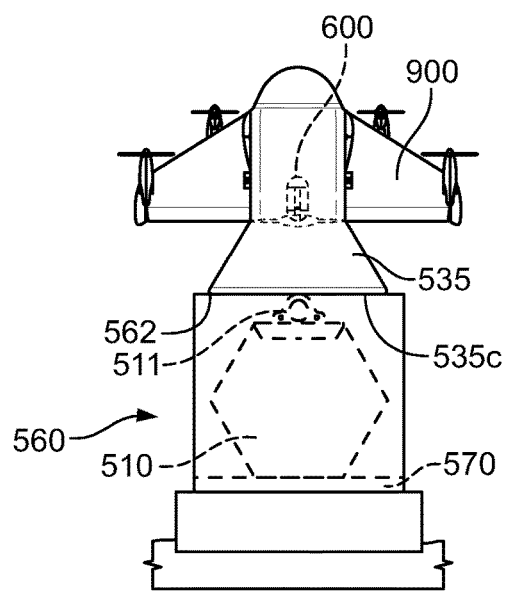
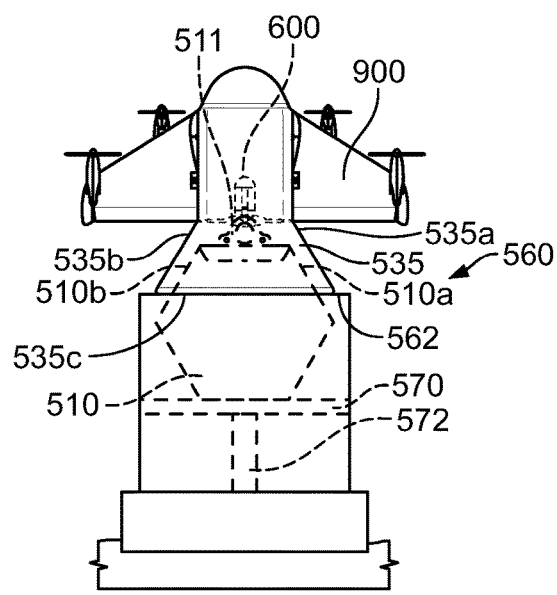
FIG. 15A          FIG. 15B
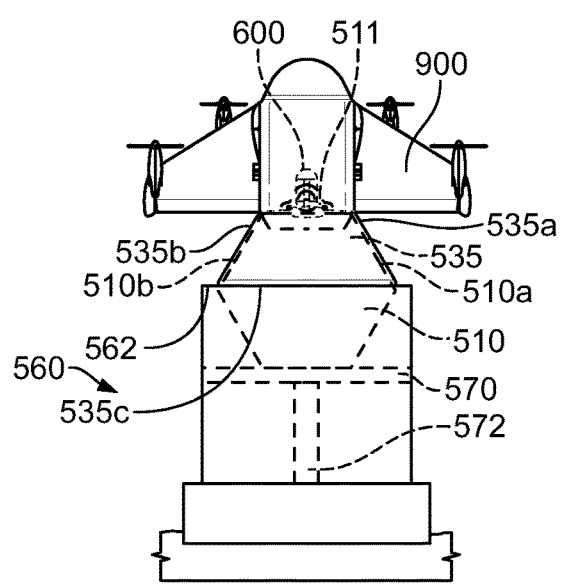
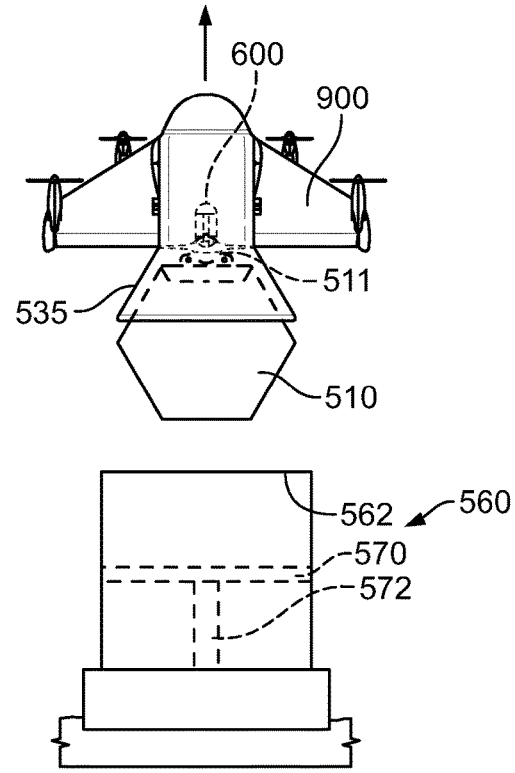
FIG. 15C          FIG. 15D

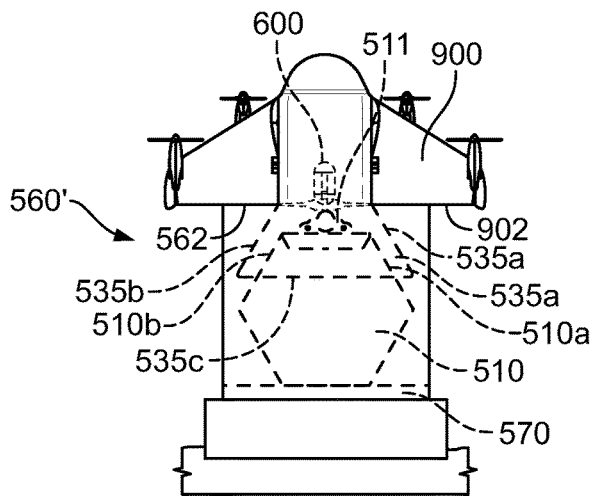
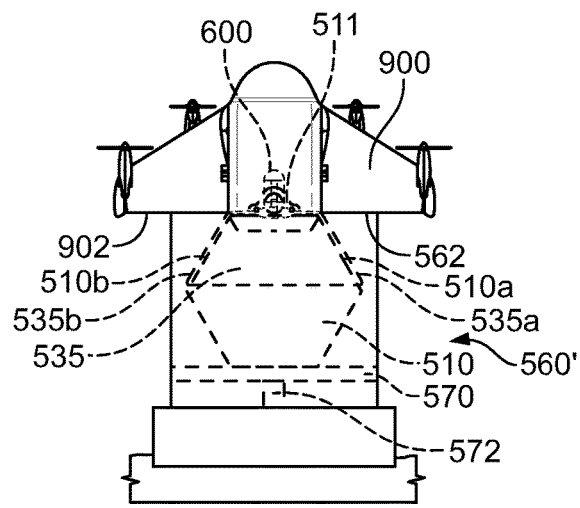
FIG. 16A  FIG. 16B
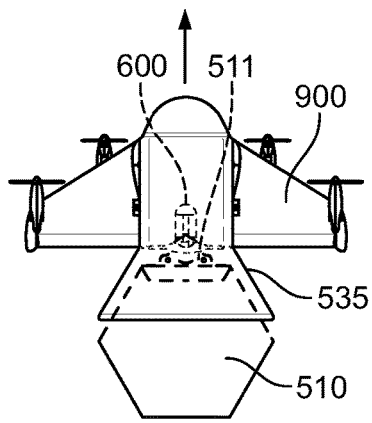
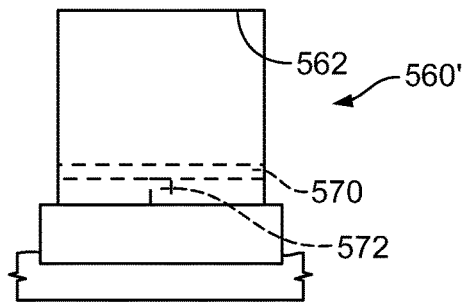
FIG. 16C

SYSTEM AND METHODS FOR AUTOMATIC PAYLOAD PICKUP BY UAV

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to deliver a payload to, or retrieve a payload from, an individual or business. In some operations, once the UAV arrives at a retrieval site, the UAV may land or remain in a hover position. At this point, a person at the retrieval site may secure the payload to the UAV at an end of a tether attached to a winch mechanism positioned with the UAV, or to the UAV itself. For example, the payload may have a handle that may be secured to a device at the end of the winch, or a handle that may be secured within the UAV. However, this scenario has a number of drawbacks. In particular, if the UAV is late for arrival at the retrieval site, the person designated for securing the payload to be retrieved by the UAV may have to wait a period of time before the UAV arrives, resulting in undesirable waiting time. Similarly, if the UAV arrives and the person designated to secure the payload to be retrieved to the UAV is delayed or fails to show up, the UAV may have to wait in a hover mode or on the ground until the designated person arrives to secure the payload to the UAV, resulting in undesirable delay and expenditure of energy by the UAV as the UAV waits for the designated person to arrive, and also resulting in undesirable delay in the subsequent delivery of the payload at a delivery site.

As a result, it would be desirable to provide for the automated pickup of a payload by the UAV, where the UAV may automatically pick up the payload without the need for a designated person to secure the payload to the UAV at the retrieval site. Such automated pickup of the payload by the UAV would advantageously eliminate the need for a designated person to secure the payload to the UAV and eliminate potential delays associated with the late arrival of the UAV or designated person at the retrieval site

SUMMARY

The present embodiments advantageously provide a system and method for automatic payload retrieval at a payload retrieval site. The present embodiments are directed to a UAV configured to have guiding features on an underside of the UAV that allow the UAV to hover over a payload to be retrieved, and as the UAV is lowered over the payload, the guiding features on the underside of the UAV guide the payload into a payload receptacle within the UAV where it may be secured to a payload coupling apparatus within the payload receptacle. Alternately, automatic payload retrieval may also be achieved using the same UAV configuration wherein the payload may land on a payload loading apparatus, and after the UAV lands, a payload may be pushed upwardly, from below or within the payload loading apparatus, into engagement with a payload coupling apparatus within a payload receptacle on the underside of the UAV. In either payload retrieval scenario, when an upper portion of the payload, such as a handle of the payload, extends a desired distance into the payload receptacle (which could be determined by sensors or switches within the payload receptacle), a payload coupling apparatus within the payload receptacle engages the upper portion (e.g., handle) of the payload to securely engage the payload within the payload receptacle. Once the payload is secured within the payload receptacle, the UAV may fly to a payload delivery site with the payload for subsequent delivery of the payload at the payload delivery site.

The payload coupling apparatus may take the form of a capsule that may be attached to an end of a tether that is secured to a winch within the UAV. The capsule may be configured with a swing arm or latch, or other engaging device, that may extend through a handle of the payload to secure the payload within the payload receptacle of the UAV. When the handle of the payload reaches a desired position within the payload receptacle, the swing arm or latch (or other engaging device) of the capsule may be caused to extend through an aperture of a handle of the payload to secure the handle of the payload within the payload receptacle of the UAV. Upon arriving at a payload delivery site, the capsule and attached payload may be lowered to the ground by the winch within the payload, and once the payload contacts the ground, the capsule may be further lowered by the winch and automatically disengage from the handle of the payload. Once the capsule is disengaged from the payload, the capsule may be winched back up to the UAV, and the UAV may fly to a payload retrieval site to retrieve another payload.

In one aspect, a payload retrieval system is provided including a UAV having a payload receptacle positioned within the UAV, a payload coupling apparatus positioned within the payload receptacle, a tether having a first end secured within the UAV and a second end attached to the payload coupling apparatus, and a payload guiding member positioned on an underside of the UAV for guiding at least part of a payload into the payload receptacle during retrieval of a payload.

In another aspect, a method of retrieving a payload is provided including the steps of (i) providing a payload retrieval system including a UAV having a payload receptacle positioned within the UAV, a payload coupling apparatus positioned within the payload receptacle, a tether having a first end secured within the UAV and a second end attached to the payload coupling apparatus, and a payload guiding member positioned on an underside of the UAV for guiding at least part of a payload into the payload receptacle during retrieval of a payload; (ii) positioning the UAV over a payload having a handle; (iii) lowering the UAV until a portion of the handle of the payload is positioned within the payload guiding member; (iv) guiding the handle of the payload with the payload guiding member towards the payload receptacle; (v) further lowering the UAV until the portion of the handle of the payload is in a desired position within the payload receptacle; (vi) securing the handle of the payload to the payload coupling apparatus within the payload receptacle; and (vii) flying the UAV with the payload secured within the payload receptacle.

In yet a further aspect, a method of retrieving a payload is provided including the steps of (i) providing a payload retrieval system including a UAV having a payload receptacle positioned within the UAV, a payload coupling apparatus positioned within the payload receptacle; a tether having a first end secured within the UAV and a second end attached to a payload coupling apparatus, and a payload guiding member positioned on an underside of the UAV for guiding at least a portion of a payload into the payload receptacle during retrieval of a payload; (ii) landing the UAV on a payload loading apparatus at a payload retrieval site, where a payload having a handle is positioned beneath the UAV; (iii) pushing the payload upwardly until the handle of the payload is positioned within the payload guiding member; (iv) guiding the handle of the payload with the payload guiding member towards the payload receptacle; (v) further pushing the payload upwardly until the handle of the payload is in a desired position within the payload receptacle; (vi) securing the handle of the payload to the payload coupling apparatus within the payload receptacle; and (vii) flying the UAV with the payload secured within the payload receptacle from the payload retrieval site.

The present embodiments further provide a system for retrieving a payload by a UAV including means for guiding a payload into a payload receptacle on an underside of the UAV and means for securing the payload within the payload receptacle.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 1E is a simplified illustration of an unmanned aerial vehicle, according to an example embodiment.

FIG. 3 is a simplified block diagram illustrating a UAV system, according to an example embodiment.

FIG. 15A is a side view of UAV 900 landed on top of payload loading apparatus 560 with payload 510 positioned therein, and a bottom of payload guiding member 535 touching upper landing platform 562, according to an example embodiment.

FIG. 15B is a side view of UAV 900 with payload guiding member 535 of UAV 900 as shown in FIG. 15A, with payload 510 being pushed upwardly into payload guiding member 535, according to an example embodiment.

FIG. 15C is a side view of UAV 900 as shown in FIGS. 15A and 15B, with payload 510 further pushed upwardly into payload guiding member 535 and handle 511 engaged with payload coupling apparatus 600, according to an example embodiment.

FIG. 15D is a side view of UAV 900 flying away with payload 510 positioned within payload guiding member 535 of UAV 900 and handle 511 secured to payload coupling apparatus 600 within UAV 900.

FIG. 16A is a side view of UAV 900 landed on top of payload loading apparatus 560 with payload 510 positioned therein, and payload guiding member 535 extending beneath upper landing platform 562, according to an example embodiment.

FIG. 16B is a side view of UAV 900 as shown in FIG. 16A, with payload 510 pushed upwardly into payload guiding member 535 and handle 511 engaged with payload coupling apparatus 600, according to an example embodiment.

FIG. 16C is a side view of UAV 900 flying away with payload 510 positioned within payload guiding member 535 of UAV 900 and handle 511 secured to payload coupling apparatus 600 within UAV 900.

DETAILED DESCRIPTION

Figure 1A:
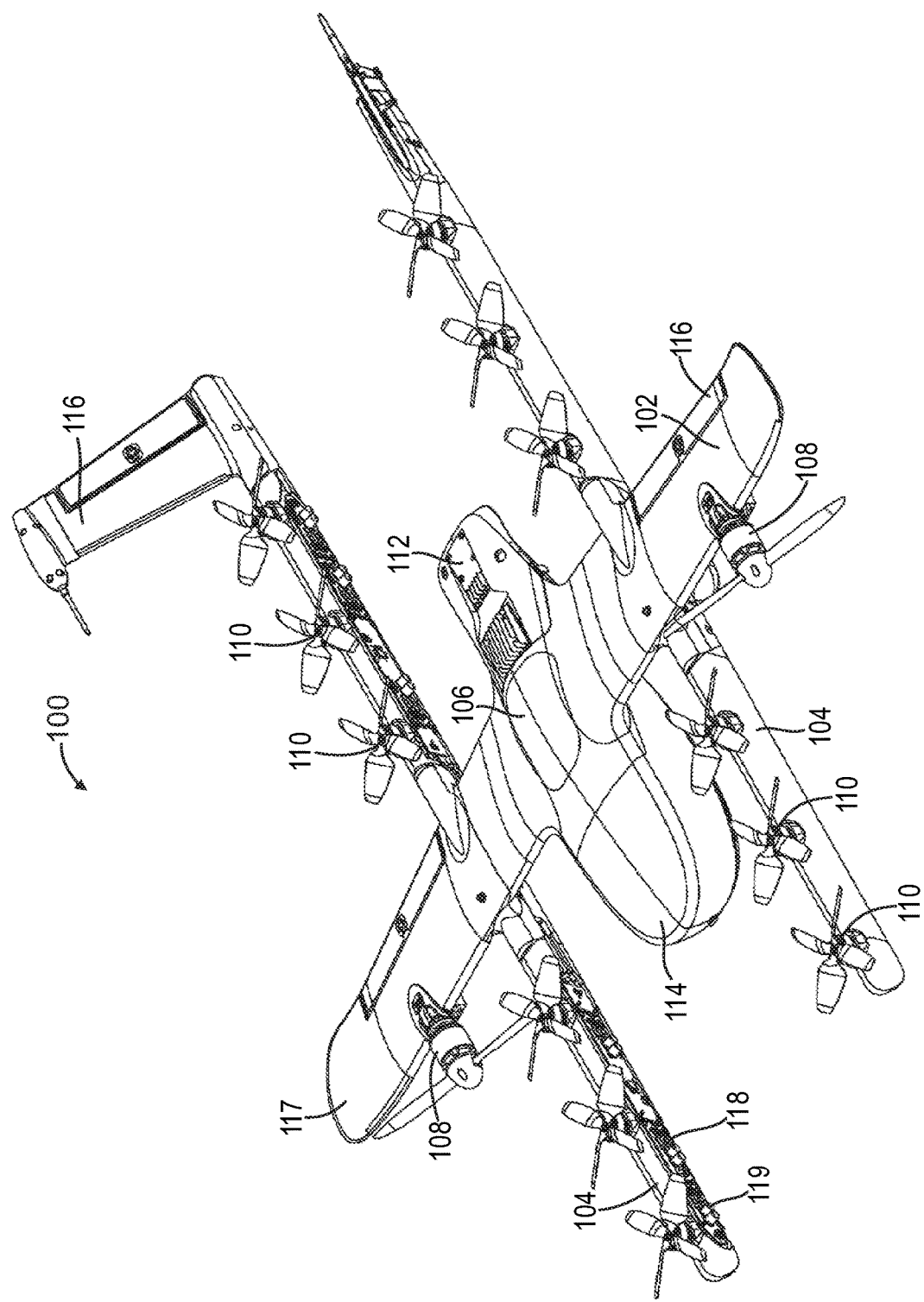
FIG. 1A is an isometric view of an example unmanned aerial vehicle 100, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments advantageously provide a system and method for automatic payload retrieval at a payload retrieval site. The present embodiments are directed to a UAV configured to have guiding features on an underside of the UAV that allow the UAV to hover over a payload to be retrieved, and as the UAV is lowered over the payload, the guiding features on the underside of the UAV guide the payload into a payload receptacle within the UAV. When an upper portion of the payload, such as a handle of the payload, extends a desired distance into the payload receptacle (which could be determined by sensors or switches within the payload receptacle), a payload coupling apparatus within the payload receptacle engages the upper portion (e.g., handle) of the payload to securely engage the payload within the payload receptacle. Once the payload is secured within the payload receptacle, the UAV may fly to a payload delivery site with the payload for subsequent delivery of the payload at the payload delivery site.

Alternately, or in addition to the automatic payload retrieval described above, automatic payload retrieval may also be achieved using the same UAV configuration wherein the payload may land on a payload loading apparatus, and after the UAV lands, a payload may be pushed upwardly, from below or within the payload loading apparatus, into engagement within a payload coupling apparatus within a payload receptacle on the underside of the UAV. In particular, using guiding features on the underside of the UAV, an upper portion of the payload, such as a handle, is guided into the payload receptacle of the UAV. When an upper portion of the payload, such as a handle of the payload, extends a desired distance into the payload receptacle (which may be determined by sensors or switches within the payload receptacle), a payload coupling apparatus within the payload receptacle engages the upper portion (e.g., handle) of the payload to securely engage the payload within the payload receptacle. Once the payload is secured within the payload receptacle, the UAV may fly to a payload delivery site with the payload for subsequent delivery of the payload at the payload delivery site.

The guiding features may take the form of a funnel-like configuration which tapers inwardly from a lower open end towards the payload receptacle to guide the upper portion of the payload (e.g., handle) towards the payload receptacle. The guiding features may be either internal or external to the UAV, or a combination of both internal and external guiding features. In this manner, the UAV may either (i) be lowered onto a payload until an upper portion of the payload is secured within the payload receptacle, or (ii) land on a payload loading apparatus and have a payload positioned below or within the payload loading apparatus pushed upwardly towards the payload receptacle until an upper portion of the payload is secured within the payload receptacle. In either case, the payload becomes secured within the payload receptacle of the UAV, and the UAV may then fly to a payload delivery site and deliver the payload. In both cases, a designated person is not required to load a payload onto the UAV, thereby eliminating any delays that could be caused to a designated loading person by the late arrival of a UAV, and any delays associated with the late arrival of a designated loading person to the payload retrieval site.

The payload coupling apparatus may take the form of a capsule that may be attached to an end of a tether that is secured to a winch within the UAV. The capsule may be configured with a swing arm or latch, or other engaging device, that may extend through a handle of the payload to secure the payload within the payload receptacle of the UAV. When the handle of the payload reaches a desired position within the payload receptacle, the swing arm or latch (or other engaging device) of the capsule may be caused to extend through an aperture of a handle to secure the handle of the payload to the capsule within the payload receptacle of the UAV. Upon arriving at a payload delivery site, the capsule and attached payload may be lowered to the ground by the winch within the UAV, and once the payload contacts the ground, the capsule may be further lowered by the winch and automatically disengage from the handle of the payload. Once the capsule is disengaged from the payload, the capsule may be winched back up to the UAV, and the UAV may fly to a payload retrieval site to retrieve another payload.

The payload retrieval system described above provides for automatic payload retrieval without the need for human involvement in securing the payload to the UAV. Thus, the UAV may simply fly into position at the payload retrieval site and position itself above a payload to be retrieved and lower itself onto the payload until the payload is secured within the payload receptacle of the UAV. Alternately, the UAV may land on a payload loading apparatus and have a payload pushed upwardly into the payload receptacle until the payload is secured within the payload receptacle. Once the payload is secured within the payload receptacle, the UAV may fly off to a payload delivery site and deliver the payload.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
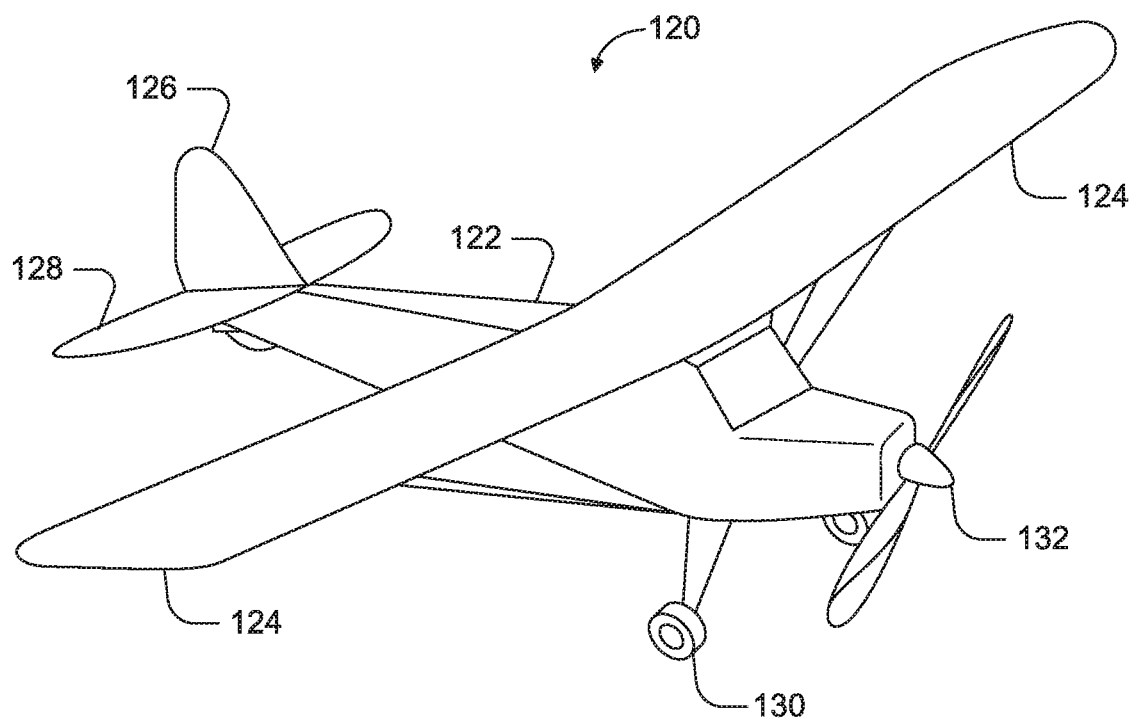
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
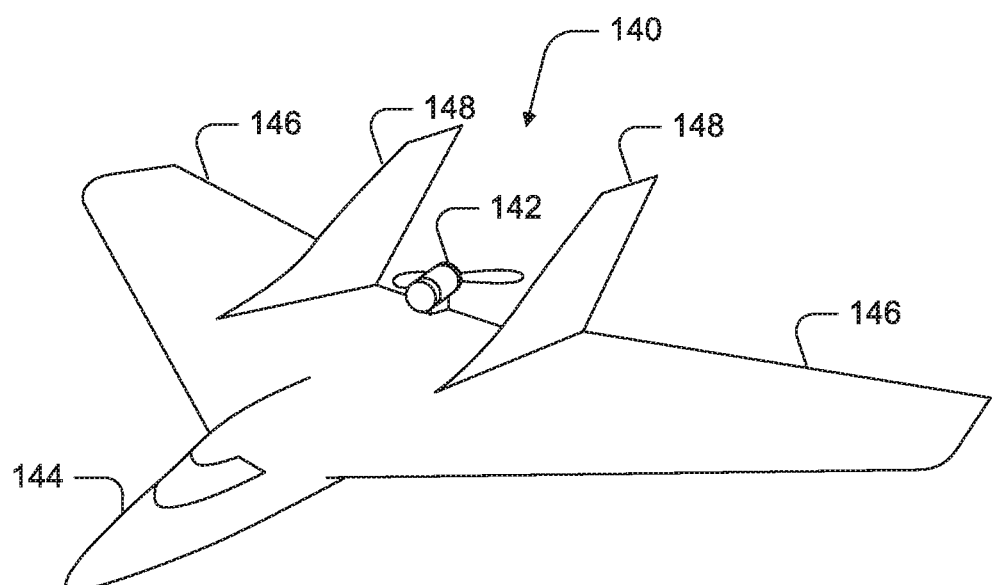
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
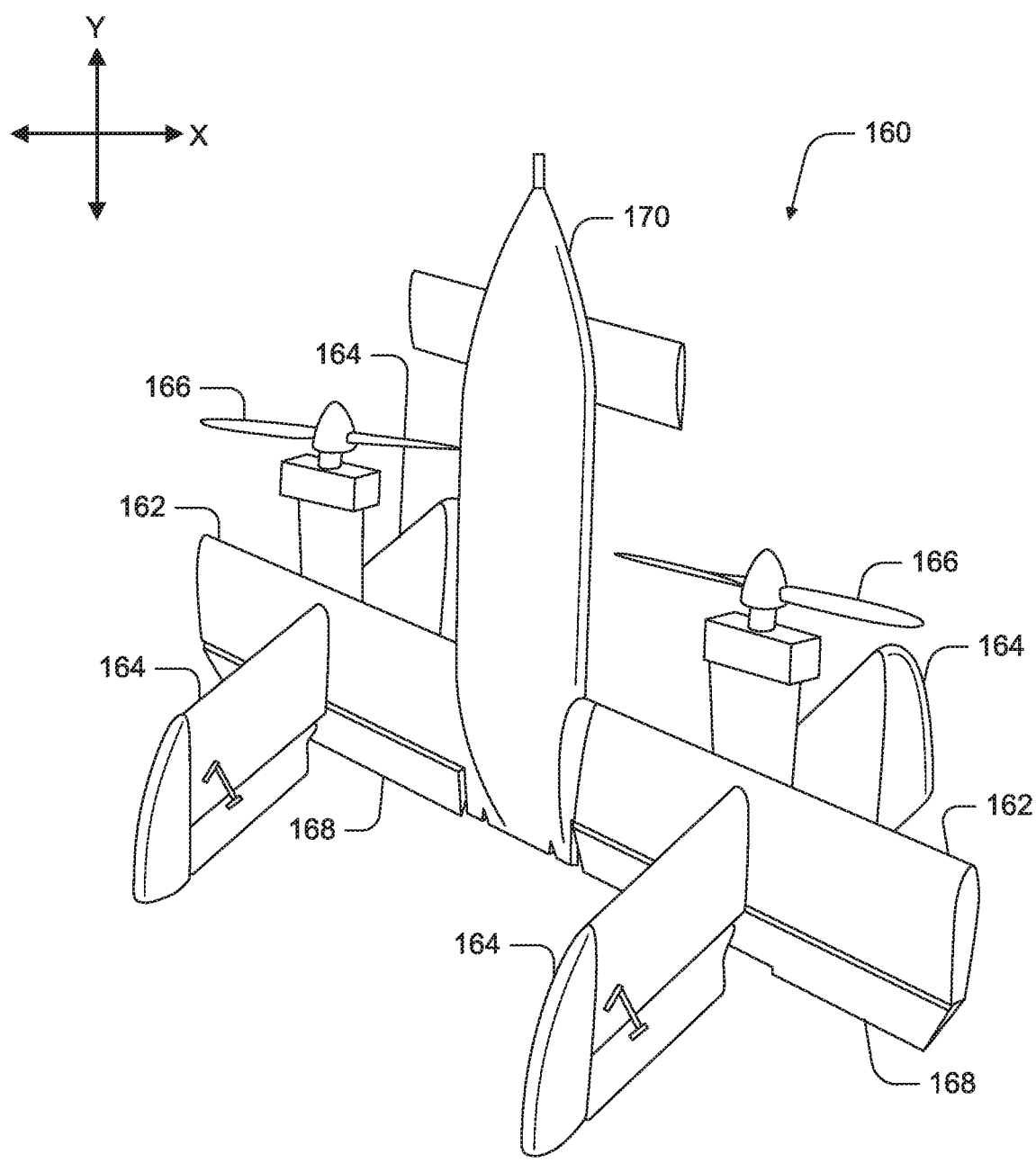
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
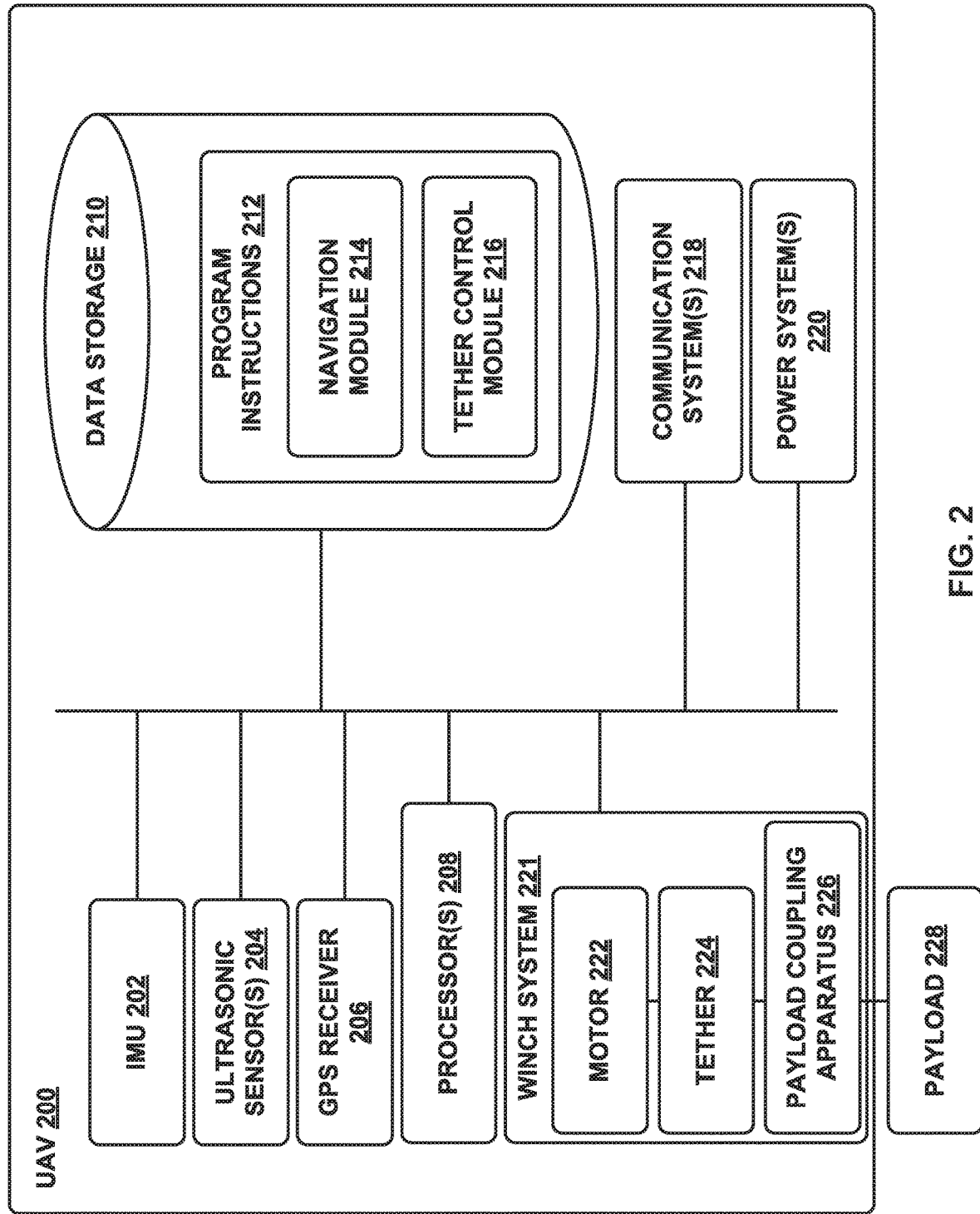
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example Systems and Apparatuses for Payload Retrieval and Delivery

A UAV may include various types of payload delivery systems for lowering the payload to a target delivery location. In some cases, the payload may be coupled to a tether with a payload coupling apparatus attached at an end of the tether, and the UAV may lower the payload to the ground by lowering the tether. The payload coupling apparatus may provide that the payload may be released on the ground, and the tether may be retracted back to the UAV.

In addition, the payload coupling apparatus may advantageously be used during automated retrieval of a payload. In particular, in the present embodiments, a UAV may position itself over a payload to be retrieved, and the UAV may be lowered onto the top of the payload using a guiding member to position a top portion and/or a handle of the payload within the UAV. Once the handle of the payload is in a desired position within the UAV, the handle of the payload may be automatically engaged and secured by the payload coupling apparatus to secure the payload to or within the UAV. Alternately, a UAV may land on a payload loading apparatus, and a payload positioned below or within the payload loading apparatus may be pushed upwardly into the UAV using a guiding member on the UAV to position the handle of the payload within the UAV. Once the handle of the payload is in a desired position within the UAV, the handle of the payload may be engaged and secured by the payload coupling apparatus automatically, and the payload subsequently secured to or within the UAV.

Figure 4A:
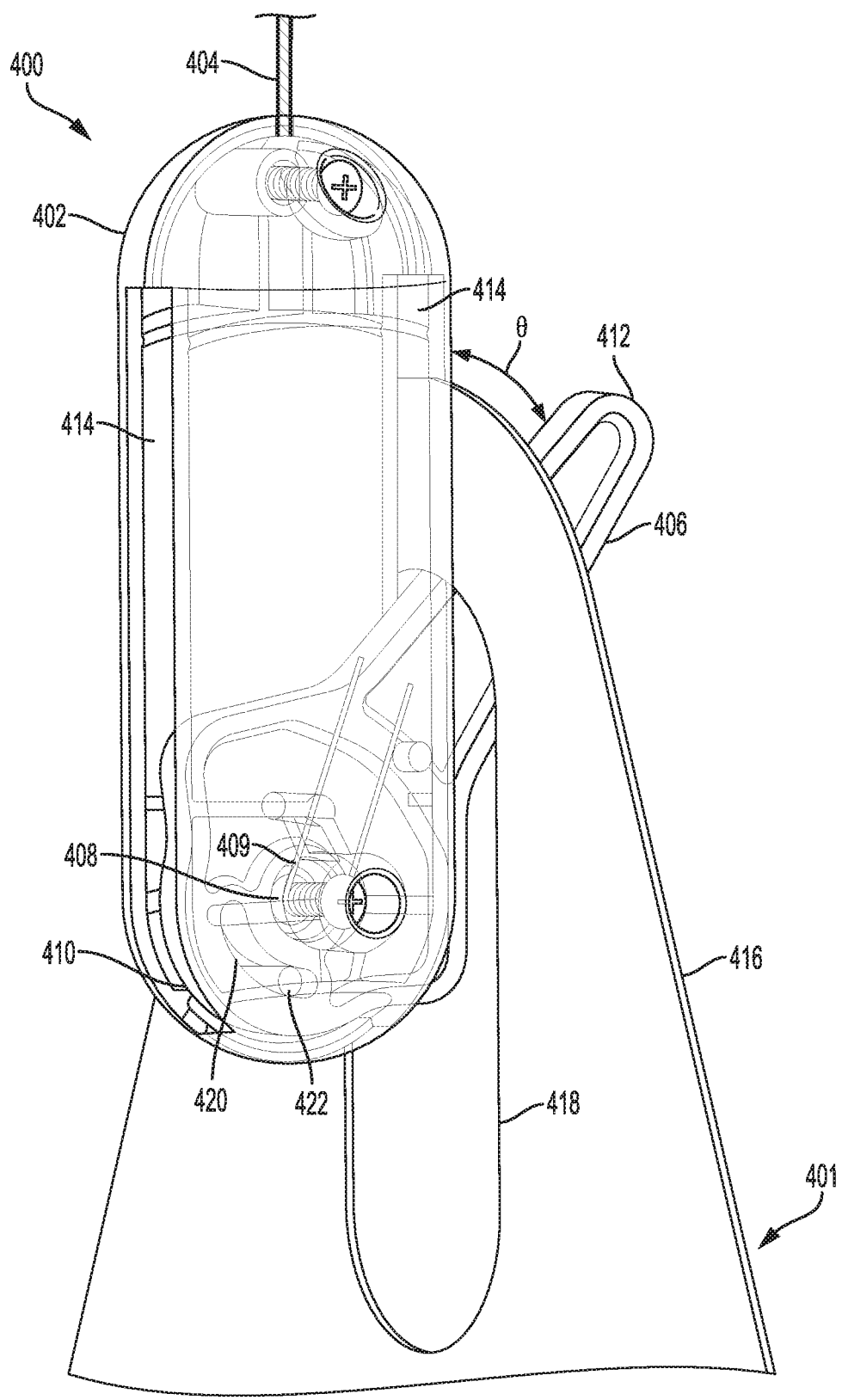
FIG. 4A shows a perspective view of payload coupling apparatus 400 with a swing arm 406 extending through a handle of a payload, according to an example embodiment.

FIG. 4A is an illustration of an example payload coupling apparatus 400 that may be used for automatic retrieval, and passive release, of a payload 401. The payload coupling apparatus 400 includes a housing 402. As illustrated, the housing 402 may take the form of a cylindrical capsule with rounded ends, but other shapes and forms are possible as well (e.g., an ellipsoid, sphere, cuboid, pyramid, cylinder, prism, cone, etc.). The housing 402 may be coupled to a tether 404, which is operable to raise and lower the payload coupling apparatus 400 with respect to a UAV.

A swing arm 406 may be coupled to the housing 402 at a pivot point 408 proximate to a first end 410 of the swing arm 406. The swing arm 406 may be coupled to the housing 402 by a mechanism that allows the swing arm 406 to rotate at least partially around the pivot point 408 (e.g., using any type of various pins, bolts, screws, etc.). The swing arm 406 may partially rotate around the pivot point 408 such that the swing arm 406 may be arranged in various positions.

In a closed (or retracted) position (shown in FIG. 4B), a second end 412 of the swing arm 406 is located within the housing 402. In an open (or extended) position (shown in FIGS. 4A and 4C), the second end 412 extends through an opening 414 of the housing 402. The housing 402 may include two opposing openings 414 such that the swing arm 406 can rotate to extend the second end 412 from either side of the housing 402.

The payload coupling apparatus 400 may further include a spring mechanism 409 that biases the swing arm 406 to rotate back into the housing 402 when the payload 401 is not applying a downward force on the swing arm 406. As depicted in FIG. 4A, the spring mechanism 409 may take the form of a torsion spring that couples the swing arm 406 to the housing 402 at the pivot point 408. The torsion spring may be in a rest state when the swing arm 406 is in the closed position (i.e., when the second end 412 is located within the housing), and the torsion spring may be adapted to exert a force on the swing arm 406 opposing rotational motion around the pivot point 408. Thus, when the swing arm 406 is in the open (or extended) position, the torsion spring may exert a force on the swing arm 406 that is directed toward the closed (or retracted) position.

FIG. 4A illustrates the payload coupling apparatus 400 in the open (or extended) position. In the open position, the second end 412 of the swing arm 406 extends from the housing 402 at an acute angle $\Theta$ with respect to a sidewall of the housing 402. Thus, in the open position, the swing arm 406 forms a hook on which the payload 401 (e.g., a package containing one or more food items, medical items, or various other goods) may be attached.

Figure 4C:
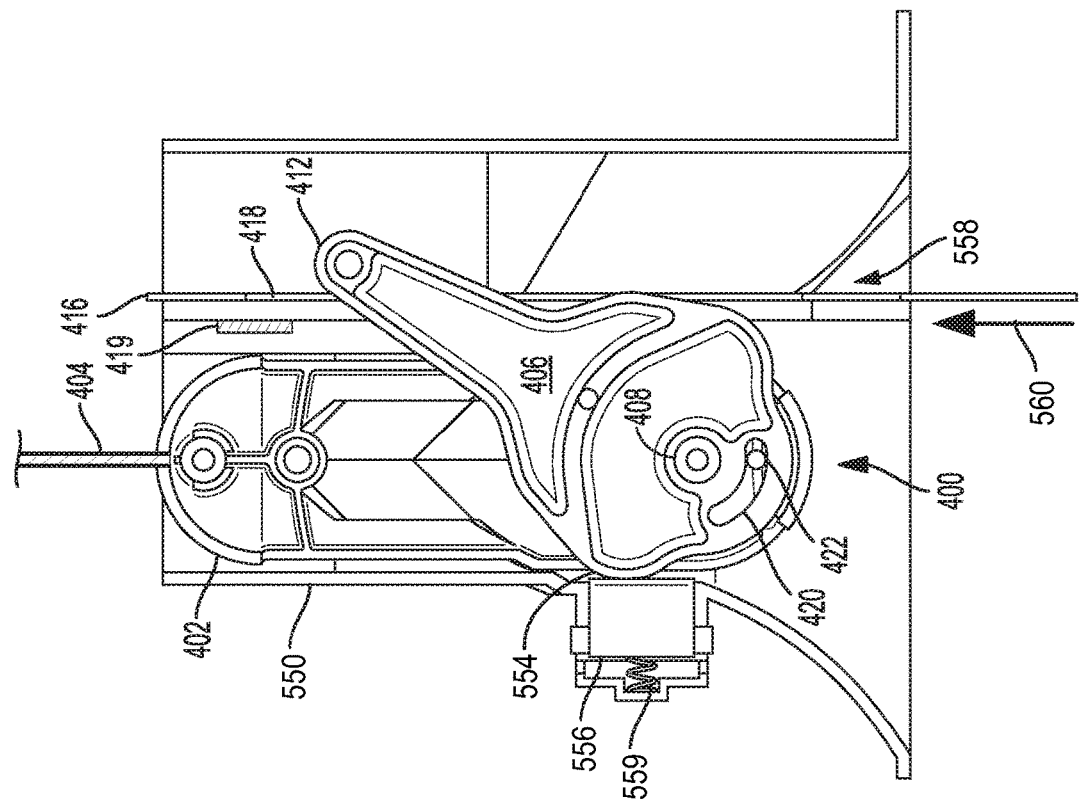
FIG. 4C shows a side view of payload coupling apparatus 400 positioned within payload receptacle 550 with swing arm 406 in an extended state, according to an example embodiment.
Figure 4B:
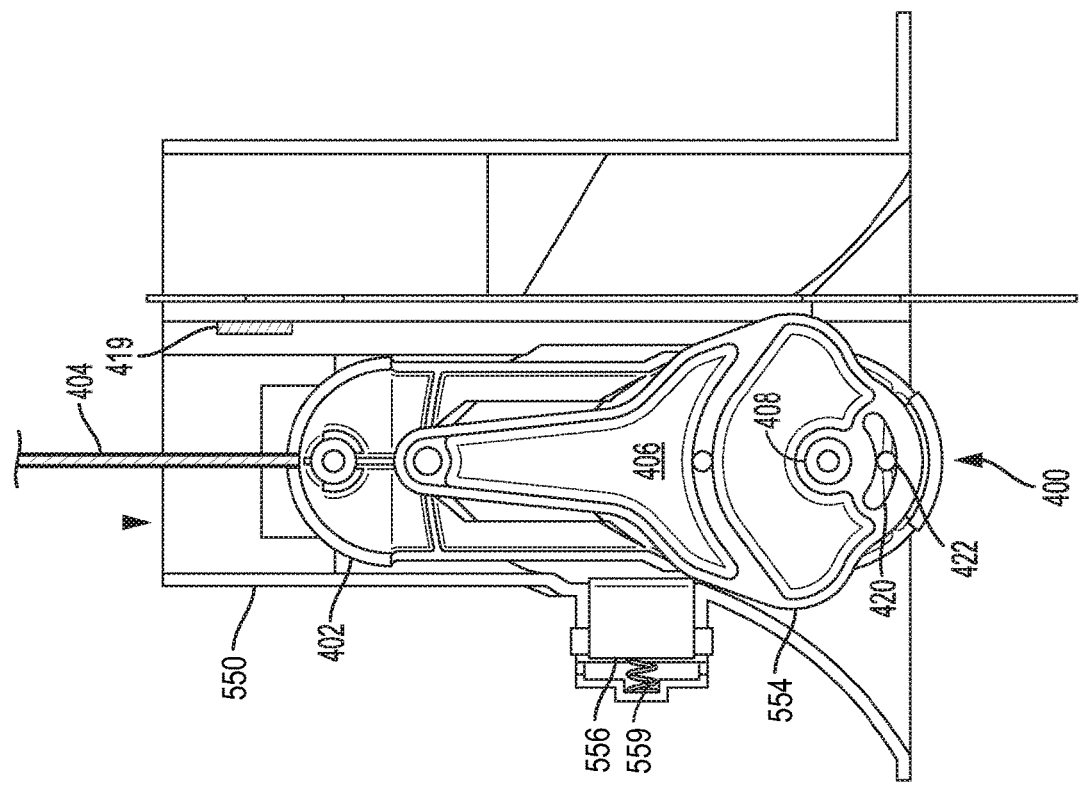
FIG. 4B shows a side view of payload coupling apparatus 400 positioned within payload receptacle 550 with swing arm 406 in a retracted state, according to an example embodiment.

The angle $\Theta$ may have a maximum value less than 90 degrees. In order to limit the angle $\Theta$ to such a maximum value, the payload coupling apparatus 400 may include a mechanism to limit, and/or be structurally designed to limit, the rotation of the swing arm 406 around the pivot point 408. For instance, as shown in FIGS. 4B and 4C, the swing arm 406 may include a slot 420 adapted to receive a pin 422, which may be integrated within the housing 402. As the swing arm 406 rotates around the pivot point 408, the pin 422 may reach an end of the slot 420, thereby preventing further rotation of the swing arm 406 and limiting the angle $\Theta$ to its maximum value.

In FIGS. 4B and 4C, a cross-sectional view of an example payload receptacle 550 for receiving the payload coupling apparatus 400 is illustrated. As used herein, the term "payload receptacle" is to be construed broadly to include an area of a UAV into which any portion of a payload, such as a handle, extends. The payload receptacle 550 may be coupled to or integrated in a UAV. For instance, the payload receptacle 550 may take the form of a feature, compartment, or system in the body of a UAV. As such, the payload receptacle 550 can receive the payload coupling apparatus 400 when the UAV raises the payload coupling apparatus 400 by winding the tether 404.

In practice, the payload receptacle 550 may include a hollow shaft 552 having an inner diameter at least slightly larger than an outer diameter of the housing 402 such that the payload coupling apparatus 400 may fit inside the shaft 552 when the swing arm 406 is in the closed position as depicted in FIG. 4A. As the UAV winds the tether 404, the payload coupling apparatus 400 may be pulled further into the shaft 552 until a cam 554 of the swing arm 406 makes contact with a cam follower 556 of the payload receptacle 550.

As illustrated in FIGS. 4A-4D, the payload coupling apparatus 400 may advantageously be used during the automated retrieval of a payload. In particular, when a handle of a payload is positioned a desired distance within the UAV, the swing arm may be extended through an aperture in the handle of the payload to secure the payload to or within the UAV.

As illustrated, the swing arm 406 may include one or more cams 554 that extend through the one or more openings 414 of the housing 402 when the swing arm 406 is in the closed (or retracted) position. When the cam follower 556 contacts the cam 554, the cam follower 556 may exert a force on the cam 554 pushing the cam 554 towards the housing 402, thereby causing the swing arm 406 to rotate around the pivot point 408 until the swing arm 406 is in the open (or extended) position as depicted in FIG. 4B. In the open position, the second end 412 of the swing arm 406 may extend through the opening 414 of the housing 402 and through an opening in the shaft 552 of the payload receptacle 550.

Figure 4D:
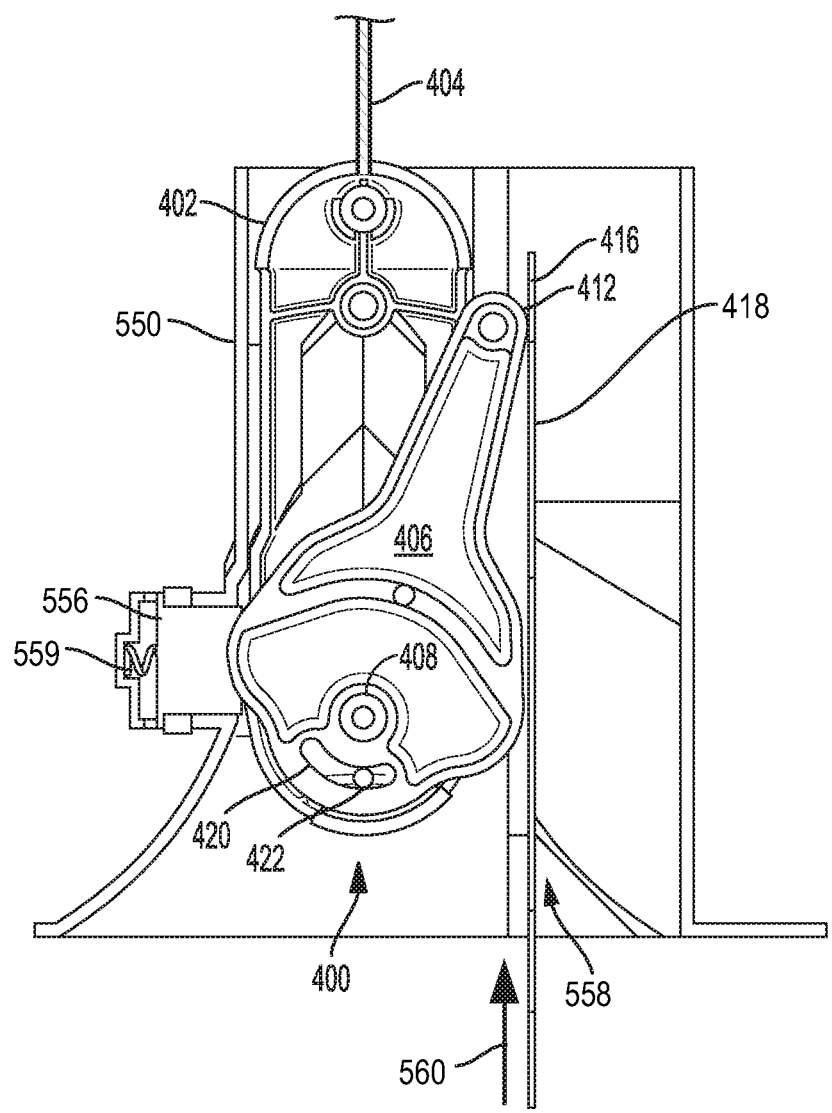
FIG. 4D shows a side view of payload coupling apparatus 400 positioned within payload receptacle 550 with handle 416 of the payload forcing the swing arm 406 inwardly as the handle 416 above aperture 418 moves upwardly into the payload receptacle 550.

Securing the handle of the payload to the payload coupling apparatus may be achieved in at least two different ways. In a first way, during the course of payload retrieval, a handle 416 of the payload is moved upwardly into slot 558 in payload receptacle 550. As shown in FIG. 4D, with the payload coupling apparatus 400 winched all the way up into payload receptacle 550 as shown in FIG. 4C, the swing arm 412 is biased by cam follower 556 into an extended position towards the right. During payload retrieval as the UAV lands on the payload, or the payload is pushed up toward the UAV, the handle 416 is moved upwardly relative to the payload coupling apparatus 400 and swing arm 412 and the upper portion of handle 416 above aperture 418 of the payload presses against second end 412 of swing arm 406 which is caused to move inwardly (causing spring 559 to compress), as shown in FIG. 4D. Once the portion of handle 416 above the aperture 418 moves upwardly past the second end 412 of swing arm 406, the swing arm 406 moves outwardly by the force of spring 559 through the aperture 418 of handle 416 of the payload. As a result, the handle 416 is automatically locked into engagement with the payload coupling apparatus 400, and the payload coupling apparatus 400 with handle 416 of the payload positioned over swing arm 406 can then be lowered together by tether 404 during payload delivery.

Alternately, as shown in FIGS. 4B and 4C, a second way of securing the handle of the payload to a payload coupling apparatus is illustrated. In FIG. 4B, the payload coupling apparatus 400 has not been fully winched upwardly into the payload receptacle 550 such that cam follower 556 is not yet in engagement with cam 554 of swing arm 406. Once handle 416 reaches a desired position within the payload receptacle 550, a sensor 419 may be triggered or tripped sending a signal to further winch up the payload coupling apparatus 400. As the payload coupling apparatus moves upwardly as shown in FIG. 4C, the cam follower 556 engages cam 554 on swing arm 406 and the swing arm 406 is moved from its closed, retracted position (shown in FIG. 4B) to an open, extended position (shown in FIG. 4C) where the second end 412 of swing arm 406 is extended through opening 418 in handle 416 of the payload. In this manner, the payload is automatically secured to the UAV by the swing arm 406 extending through opening 418 in handle 416 of the payload.

In either way of securing the handle of the payload to the payload coupling apparatus, in order to allow the swing arm 406 to rotate to secure the handle 416 of the payload to the payload coupling apparatus 400, the cam follower 556 may take the form of a spring-loaded cam follower having a spring 559. The cam follower may have other geometries and configurations beyond those shown. Specifically, the force of the cam follower 556 against the cam 554 may cause the swing arm 406 to rotate around the pivot point 408 until the second end 412 of the swing arm 406 extends through the opening 418 of the handle 416 at an acute angle with respect to the housing 402.

With the second end 412 of the swing arm 406 extending through the opening 418 of the handle 416 at an acute angle with respect to the housing 402, the swing arm 406 forms a hook on which the handle 416 of the payload may hang. To deliver the payload, with the payload attached to the swing arm 406 by the handle 416, the payload coupling apparatus 400 may be lowered from the UAV by the tether 404. For instance, the UAV may include a spool for winding and unwinding the tether 404. By unwinding the tether 404, the payload coupling apparatus 400 may be lowered away from the UAV (e.g., to the ground).

Once the payload 401 has been completely lowered to the ground, the payload coupling apparatus 400 may passively detach from the payload by continuing to lower the payload coupling apparatus 400 from the UAV. As the payload coupling apparatus 400 is lowered, the payload (and consequently the handle 416) remains stationary on the ground. By sufficiently lowering the payload coupling apparatus 400 with respect to the handle 416, the spring mechanism 409 causes the second end 412 of the swing arm 406 to retract through the opening 418 of the handle 416 and into the housing 402 (i.e., to the closed, retracted position) once the handle 416 no longer obstructs the opening 414 of the housing 402.

When further unwinding the tether 404 and lowering the payload coupling apparatus 400 after the payload reaches the ground, a downward gravitational force and/or a downward inertial force due to the downward motion of the payload coupling apparatus 400 cause the payload coupling apparatus 400 to move downward with respect to the handle 416 and detach from handle 416, allowing the swing arm 406 to retract through the opening 418 of the handle 416. The steps of delivering a payload are illustrated in FIGS. 12B-12D.

Figure 6:
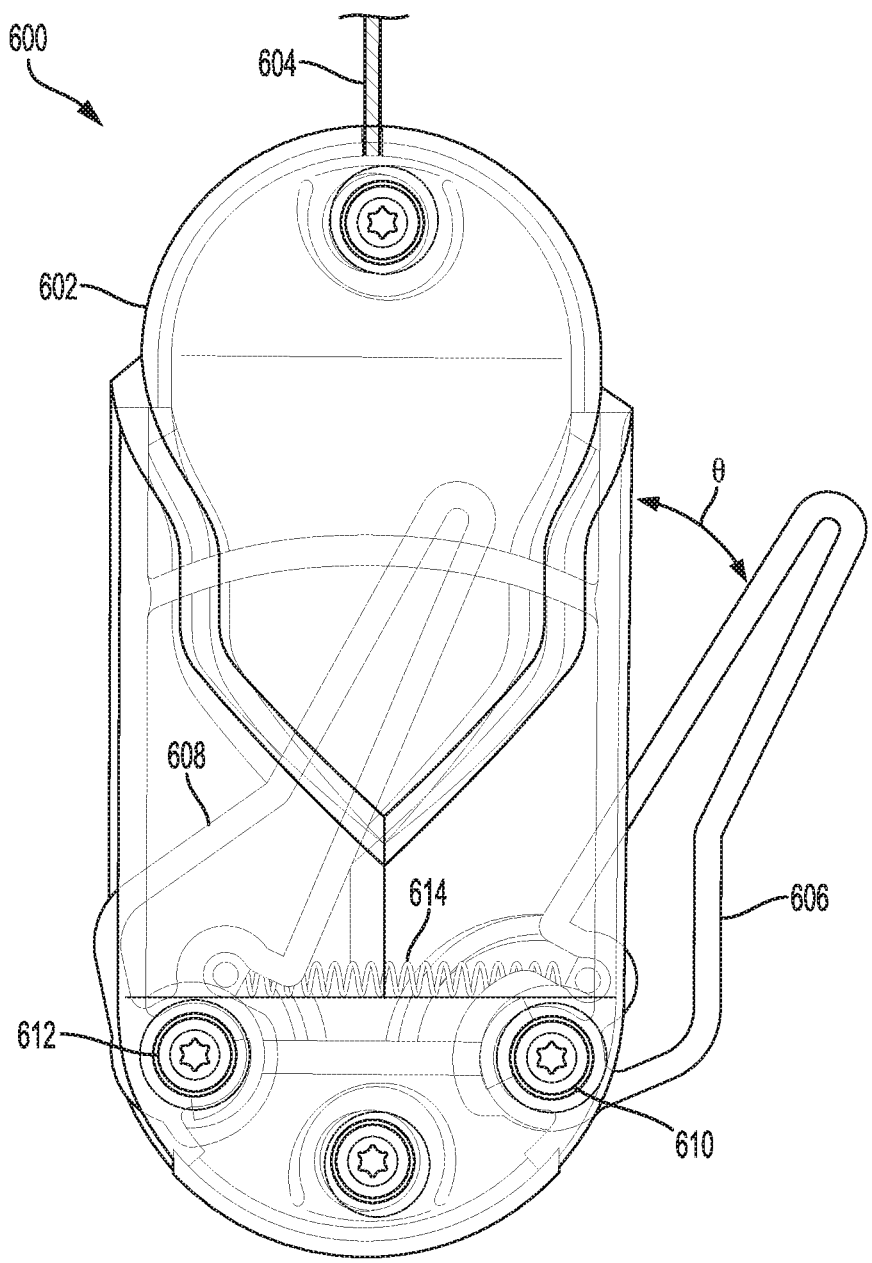
FIG. 6 is a side view of payload coupling apparatus 600 having swing arms 606 and 608, according to an example embodiment.
Figure 8:
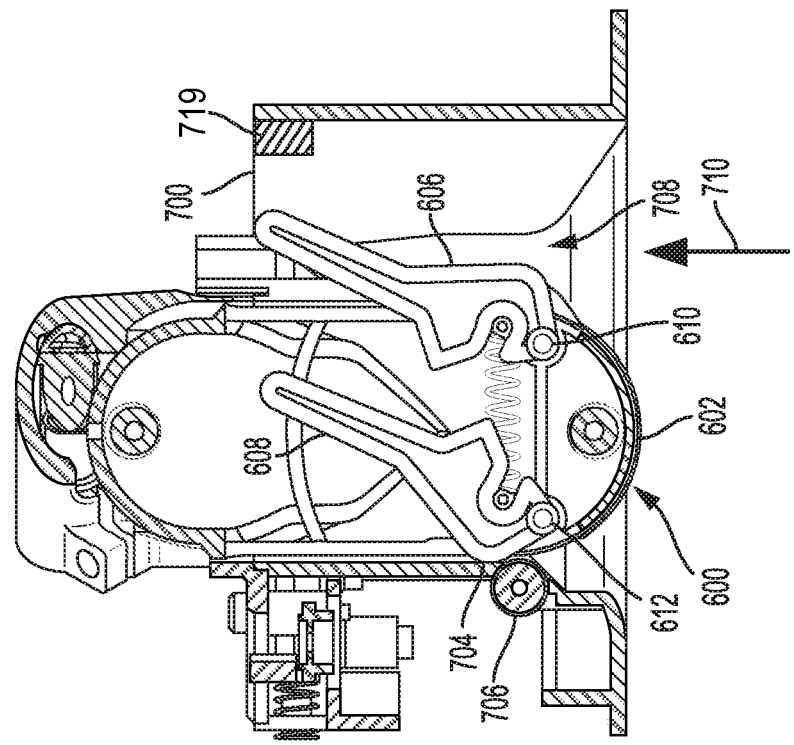
FIG. 8 is a cross-sectional view of payload coupling apparatus 600 within payload receptacle 700 with swing arms 606 and 608 shown in an extended state.
Figure 7:
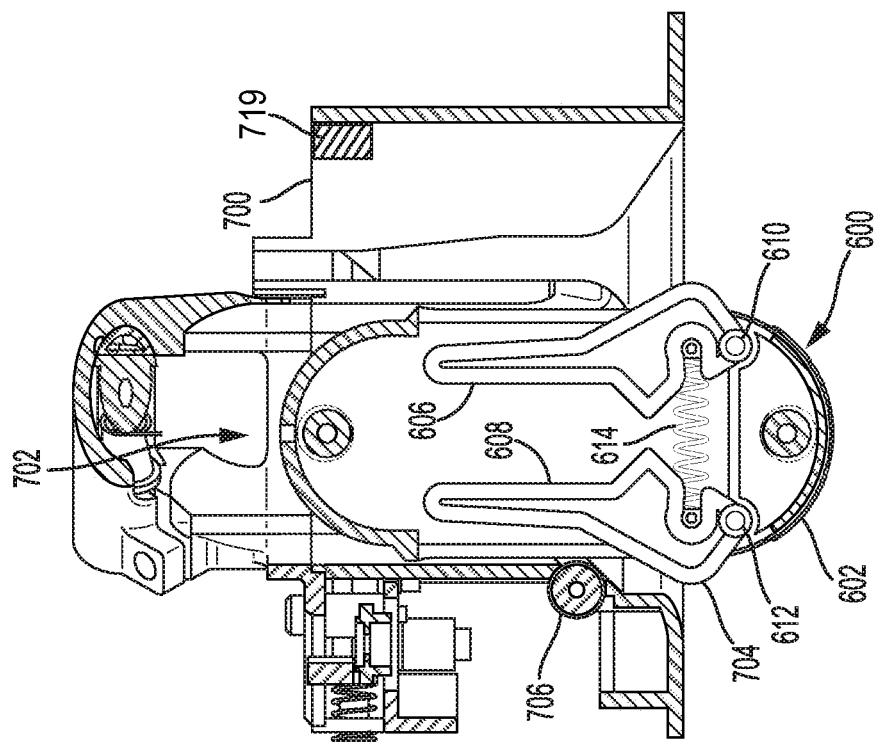
FIG. 7 is a cross-sectional view of payload coupling apparatus 600 within payload receptacle 700 with swing arms 606 and 608 shown in a retracted state.

Referring next to FIG. 6-8, another example payload coupling apparatus 600 for retrieving and/or passively releasing a payload is illustrated. Similar to the payload coupling apparatus 400 depicted in FIGS. 4A-C, the payload coupling apparatus 600 depicted in FIG. 6 may include a housing 602 coupled to a UAV by a tether 604. However, rather than only having one swing arm, the payload coupling apparatus 600 may include two swing arms 606, 608 each adapted to rotate around one of two pivot points 610, 612. The swing arms 606, 608 may be coupled by a spring 614 such that when the spring is in a rest position, the swing arms 606, 608 are in the closed, retracted position (i.e., the ends of the swing arms 606, 608 are located within the housing 602).

Like the payload receptacle 550 depicted in FIGS. 4B and 4C, the payload receptacle 700 depicted in FIGS. 7 and 8 may include a hollow shaft 702 having an inner diameter at least slightly larger than an outer diameter of the housing 602 such that the payload coupling apparatus 600 may fit inside the shaft 702 when the swing arms 606, 608 are in the closed (or retracted) position as depicted in FIGS. 6 and 8.

As the UAV winds the tether 604, the payload coupling apparatus 600 may be pulled further into the shaft 702 until a cam 704 of one of the swing arms 606, 608 makes contact with a cam follower 706 of the payload receptacle 700. As illustrated, the swing arms 606, 608 may include cams 704 that extend outside of the housing 602 when the swing arms 606, 608 are in the closed position. In some embodiments, the cam follower 706 may be a spring-loaded cam follower similar to the cam follower 556 depicted in FIGS. 4B and 4C. Alternatively, the cam follower 706 may be a rotating element, such as a wheel, adapted to make a rolling contact with the cam 704, or the cam follower 706 may be a stationary element, such as a surface of the hollow shaft 702.

In the arrangement depicted in FIGS. 7 and 8, when the cam follower 706 contacts the cam 704, the cam follower 706 may exert a force on the cam 704 pushing the cam 704 towards the housing 602, thereby causing swing arm 608 to rotate around pivot point 612. This rotation of swing arm 608 may compress the spring 614, causing the spring 614 to exert a force on swing arm 606. The force on swing arm 606 may cause swing arm 606 to rotate around pivot point 610 until swing arm 608 is in the open (or extended) position as depicted in FIG. 8. In the open (or extended) position, the second end of swing arm 606 may extend through an opening of the housing 602 and through an opening in the shaft 702 of the payload receptacle 700 and through a handle of a payload.

As illustrated in FIGS. 6-8, the payload coupling apparatus 600 may advantageously be used during the automated retrieval of a payload. In particular, when a handle of a payload is positioned a desired distance within the UAV, the swing arm may be extended through an aperture in the handle of the payload to secure the payload to or within the UAV.

During the course of payload retrieval, a handle of the payload is moved upwardly into slot 708 in payload receptacle 700. In the same manner as described above with respect to FIG. 4D, as it moves upwardly into payload receptacle 708, the portion of the handle above the aperture in the handle may force the swing arm 606 inwardly (and compress spring 614 at the same time) until it moves past the outer end of swing arm 606 at which point the swing arm again is extended by outwardly by spring 614 through the aperture in the handle of the payload. As a result, the handle of the payload is automatically locked into engagement with the payload coupling apparatus 600 with swing arm 606, and the payload coupling apparatus 600 with the handle of the payload positioned over swing arm 606 can then be lowered together by tether 604 during payload delivery.

Alternately, as shown in FIG. 7, the payload coupling apparatus 600 has not been fully winched upwardly into the payload receptacle 700 such that cam follower 706 is not yet in engagement with cam 704 of swing arm 608. Once handle of the payload reaches a desired position within the payload receptacle 700, a sensor 719 may be triggered or tripped sending a signal to further winch up the payload coupling apparatus 600. As the payload coupling apparatus 600 moves upwardly as shown in FIG. 8, the cam follower 706 engages cam 704 on swing arm 608 and the swing arm 606 is moved from its closed, retracted position (shown in FIG. 7) to an open, extended position where the second end of swing arm 606 is extended through an opening in the handle of the payload. In this manner, the payload is automatically secured to the UAV by the swing arm 606 extending through an opening in the handle of the payload.

With the swing arm 606 in the open (extended) position (i.e., extending through an opening of the housing 602 at an acute angle with respect to the housing 602), the swing arm 606 forms a hook on which a payload may hang. Thus, the UAV may deliver the payload by lowering the payload coupling apparatus 600 (and consequently the payload hanging from the payload coupling apparatus 600) to a target location, at which point the payload coupling apparatus 600 may detach from the payload as described above with reference to the payload coupling apparatus 400 depicted in FIGS. 4A-C.

Figure 10:
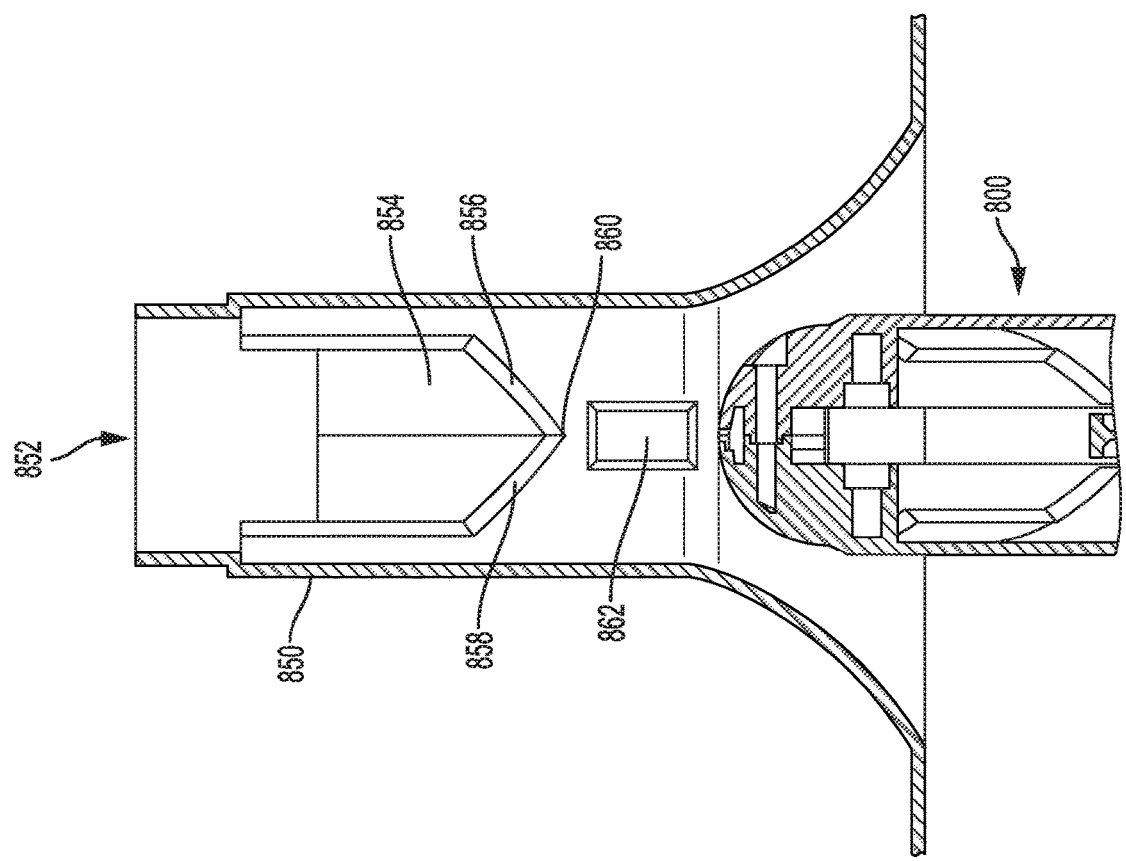
FIG. 10 is a cross-sectional view of payload coupling apparatus 800 beneath a payload receptacle 850, according to an example embodiment.
Figure 9:
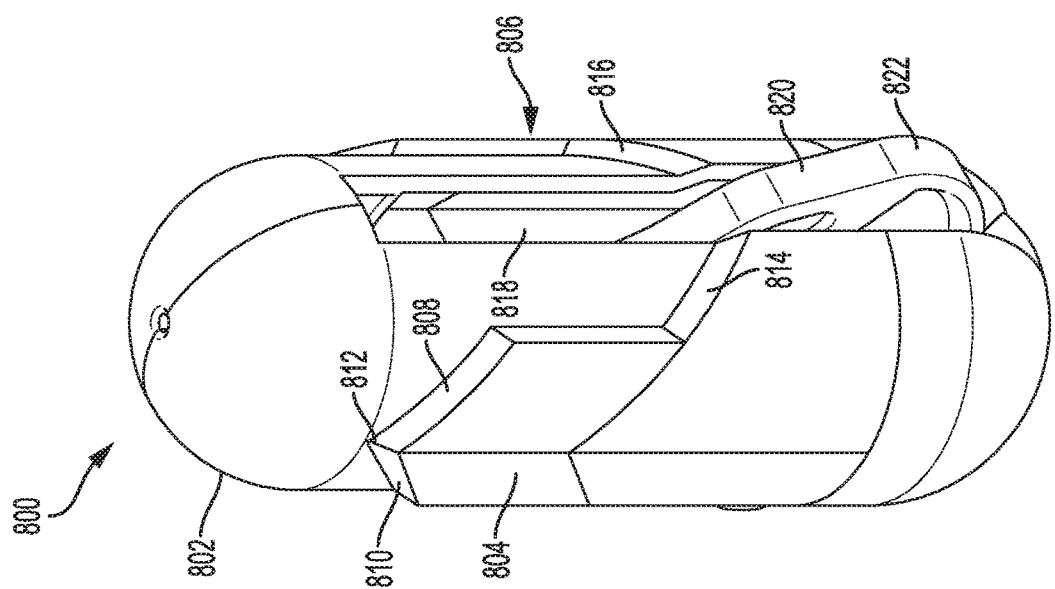
FIG. 9 is a perspective view of payload coupling apparatus 800, according to an example embodiment.

Referring back to FIGS. 4B, 4C, 7, and 8, in order for the cam followers 556, 706 of the payload receptacles 550, 700 to contact the cams 554, 704 of the swing arms 406, 606, 608, the payload coupling apparatuses 400, 600 may need to be properly aligned within the payload receptacles 550, 700. Thus, the payload coupling apparatuses 400, 600 and the payload receptacles 550, 700 may include one or more alignment mechanisms. FIGS. 9 and 10 illustrate such alignment mechanisms with respect to payload coupling apparatus 800, according to an example embodiment.

The payload coupling apparatus 800 may include a housing 802 having a first alignment mechanism. The first alignment mechanism may include a protruding area 804 that protrudes from the housing 802 and a recessed area 806 adjacent to the protruding area 804 that is recessed with respect to the protruding area 804. A portion of the protruding area 804 may be defined by a first helical edge 808 and a second helical edge 810. Helical edge 808 may be arranged along a portion of a helical path traversing a portion of the housing 802 at a first slope. Similarly, helical edge 810 may be arranged along a portion of a helical path traversing a portion of the housing 802, but at a second slope opposite in direction from the first slope. In this manner, the helical edges 808, 810 may intersect at an apex 812 of the protruding area 804.

The recessed area 806 adjacent to the protruding area 804 may also include a first helical edge 814 and a second helical edge 816. Helical edge 814 may be arranged along a portion of a helical path traversing a portion of the housing 802, and such a helical path may have a slope similar or equivalent to the slope of the helical path defined by helical edge 808 of the protruding area 804. Similarly, helical edge 816 may be arranged along a portion of a helical path traversing a portion of the housing 802, and such a helical path may have a slope similar or equivalent to the slope of the helical path defined by helical edge 810 of the protruding area 804. In this manner, the helical paths defined by helical edges 814, 816 may be arranged to intersect at an apex of the recessed area 806. However, as depicted in FIG. 9, this intersection point of the helical paths may coincide with an opening 818 in the housing 802 through which a swing arm 820 may extend. Thus, the helical edges 814, 816 of the recessed area 806 may not converge with one another.

In addition to the protruding area 804 and the recessed area 806, the payload coupling apparatus 800 may further include a second protruding area (not shown) similar in design to the protruding area 804 located on a side of the housing 802 directly opposite the protruding area 804, as well as a second recessed area (not shown) similar in design to the recessed area 806 located on a side of the housing 802 directly opposite the recessed area 806. Such an arrangement of opposing protruding and recessed areas may allow for the payload apparatus 800 to be aligned in one of two positions rotationally offset from one another by 180 degrees.

As depicted in FIG. 10, the payload receptacle 850 may include a hollow shaft 852 for receiving the payload coupling apparatus 800, and the hollow shaft 852 may include a second alignment mechanism adapted to interlock with the first alignment mechanism of the payload coupling apparatus 800. The second alignment mechanism may include a protruding area 854 that protrudes from a surface of the shaft 852. Similar to the protruding area 804 of the payload coupling apparatus 800, a portion of the protruding area 854 of the payload receptacle 850 may be defined by a first helical edge 856 and a second helical edge 858. Helical edge 856 may be arranged along a portion of a helical path having a first slope and traversing a portion of the shaft 852. Similarly, helical edge 858 may be arranged along a portion of a helical path having a second slope and traversing a portion of the shaft 852. The slopes of helical edges 856 and 858 may be similar or equivalent to the slopes of helical edges 814 and 816, respectively, such that helical edges 856 and 858 may intersect at an apex 860 of the protruding area 854.

When the payload coupling apparatus 800 is received by the payload receptacle 850 (e.g., due to a UAV winding a tether coupled to the payload coupling apparatus 800), the alignment mechanisms of the payload coupling apparatus 800 and the payload receptacle 850 may contact one another. In practice, an edge of the protruding area 854 of the payload receptacle 850 may contact an edge of the protruding area 804 of the payload coupling apparatus 800. Based on the manner in which the protruding areas 854, 804 contact one another, the payload coupling apparatus 800 may rotate within the payload receptacle 850 until the alignment mechanisms interlock, that is, when the protruding area 854 of the payload receptacle 850 aligns with the recessed area 806 of the payload coupling apparatus 800.

As the payload coupling apparatus 800 is pulled into the payload receptacle 850, the alignment mechanism of the payload receptacle 850 may align with various portions of the alignment mechanism of the payload coupling apparatus 800. In one example, as depicted in FIG. 10, apex 860 may align with the intersection point of the helical paths associated with helical edges 814 and 816. In this case, the payload coupling apparatus 800 may not rotate at all, as the alignment mechanisms are already aligned such that protruding area 854 may interlock with recessed area 806. In another example, apex 860 may align with helical edge 808. In this case, helical edges 808 and 856 may contact one another, and their helical shapes may cause the payload coupling apparatus 800 to rotate clockwise until protruding area 854 aligns with and interlocks with recessed area 806. In yet another example, apex 860 may align with helical edge 810. In this case, helical edges 810 and 858 may contact one another, and their helical shapes may cause the payload coupling apparatus 800 to rotate counterclockwise until protruding area 854 aligns with and interlocks with the recessed area (not shown) that is opposite from recessed area 806. Other examples are possible as well.

Figure 5A:
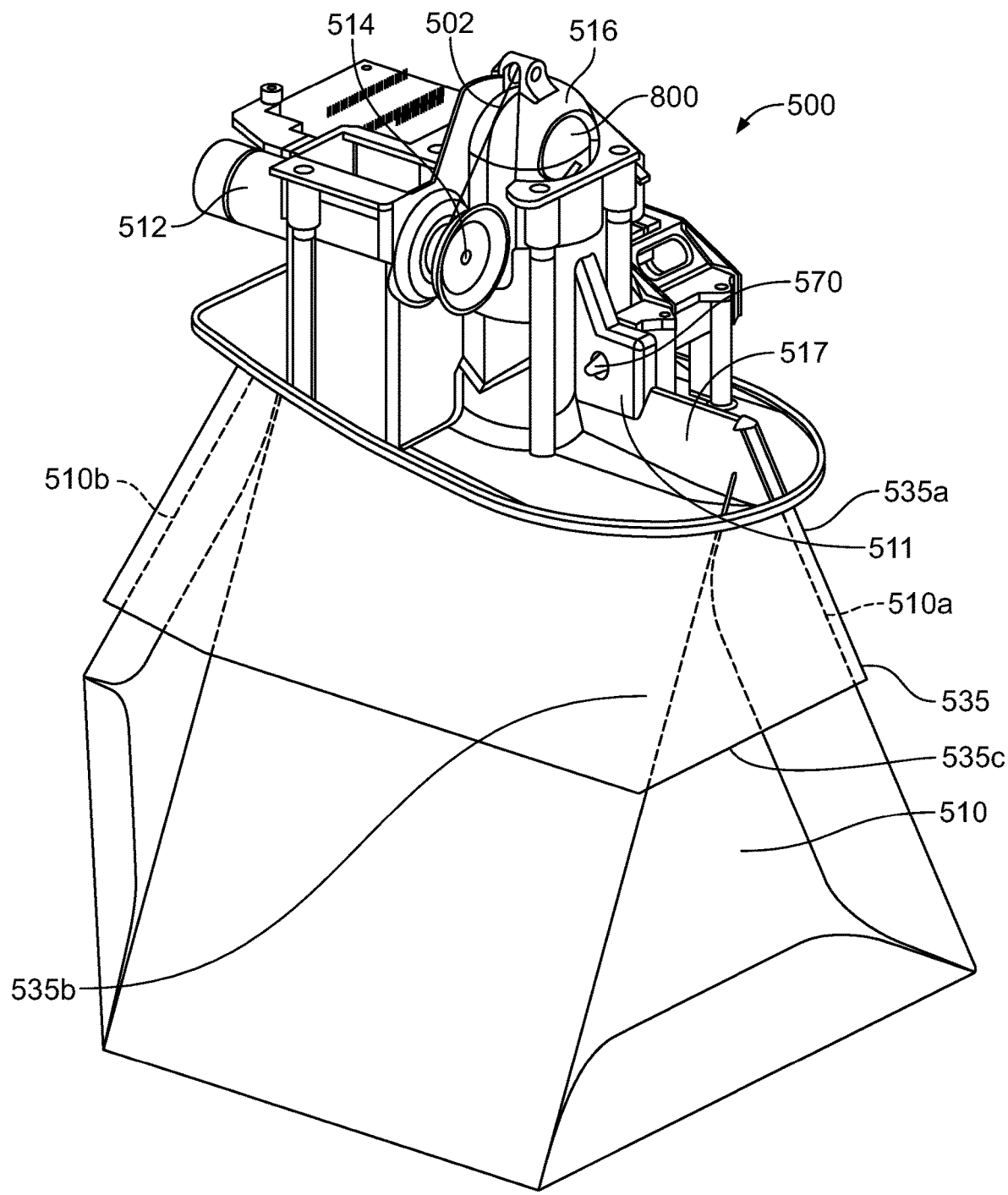
FIG. 5A shows a perspective view of a payload retrieval and delivery apparatus 500 including payload 510, according to an example embodiment.

FIG. 5A shows a perspective view of a payload retrieval and delivery apparatus 500 having payload 510 secured thereto, according to an example embodiment. Payload retrieval and delivery apparatus 500 includes a payload guiding member 535 that is positioned over the top portion 517 of payload 510. The payload guiding member 535 is used to guide the top portion 517 of payload 510 and handle 511 into a payload receptacle within the payload retrieval and delivery apparatus 500. In particular, the payload guiding member has a lower open end 535c that extends over the top portion 517 of payload 510 during retrieval. As the UAV is lowered down over the payload 510, or the payload is pushed upwardly toward the UAV, during retrieval, the payload guiding member 535 has inwardly tapered walls 535a and 535b that extend from the lower open end 535c towards the payload receptacle in the UAV and guide handle 511 and tapered outer edges 510a and 510b of payload 510 towards the payload receptacle within the UAV. The UAV (not shown) includes a winch 514 powered by motor 512, and a tether 502 spooled onto winch 514. The tether 502 is attached to a payload coupling apparatus 800 positioned within a payload receptacle 516 positioned within the fuselage of the UAV (not shown). As described in more detail above, as the handle 511 of payload 510 moves upwardly into the payload receptacle of the UAV, a swing arm or latch on the payload coupling apparatus 800 (or 400 or 600) is extended through an aperture of handle 511 of payload 510 to secure the payload 510 within the payload receptacle of the UAV. In this embodiment, a top portion 517 of payload 510 is secured within the fuselage of the UAV. A locking pin 570 is shown extending through handle 511 attached to payload 510 to further positively secure the payload to the UAV during high speed flight.

Figure 5B:
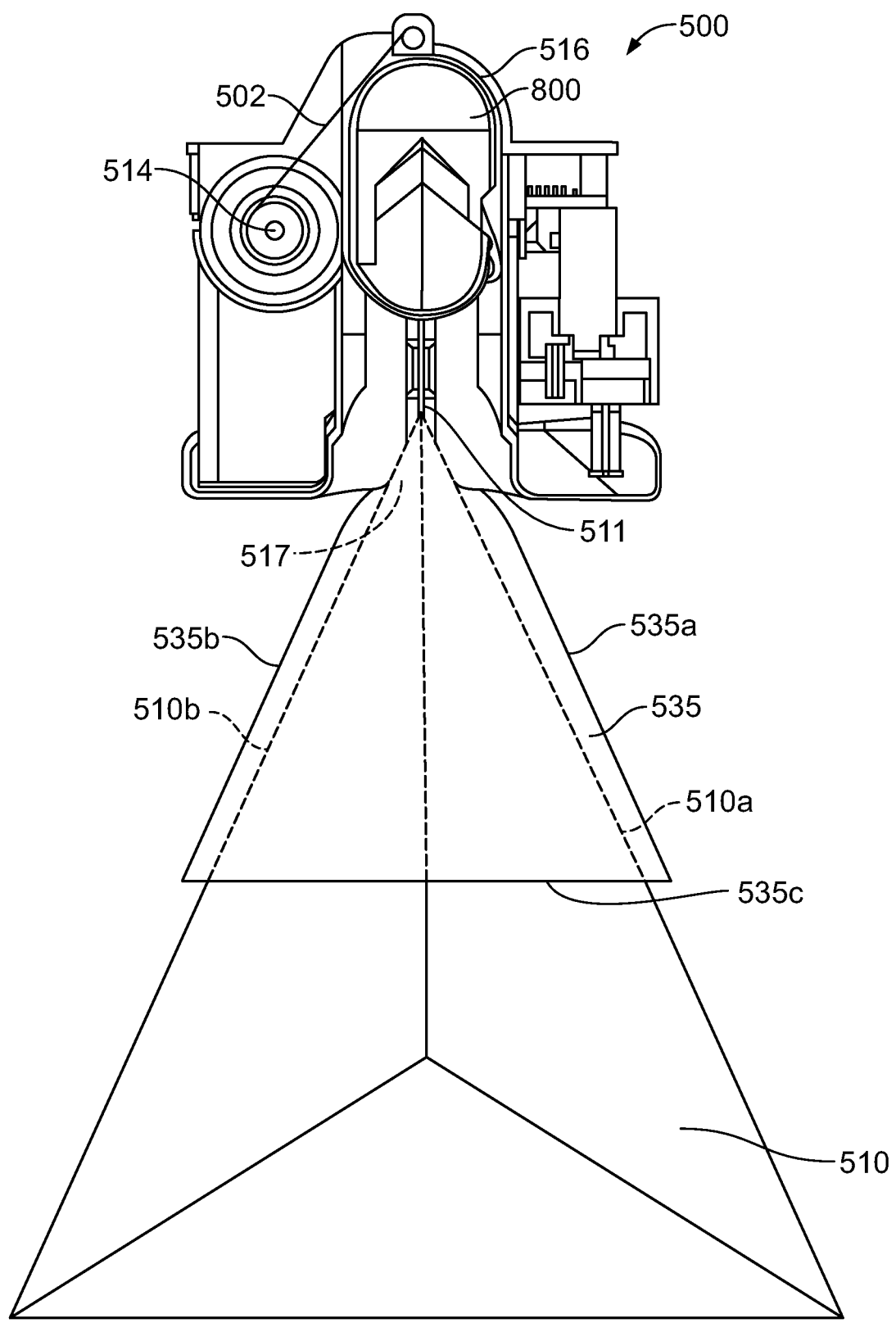
FIG. 5B is a side view of payload retrieval and delivery apparatus 500 and payload 510 shown in FIG. 5A.

FIG. 5B is another cross-sectional side view of payload retrieval and delivery apparatus 500 and payload 510 shown in FIG. 5A. In this view, the payload coupling apparatus 800 is shown tightly positioned with the payload receptacle 516. Tether 502 extends from winch 514 and is attached to the top of payload coupling apparatus 800. Top portion 517 of payload 510 is shown positioned within the fuselage of the UAV and handle 511 of payload 510 is secured to payload coupling apparatus 800. Inwardly tapered walls 535a and 535b of guiding member 535 extend over and closely conform to tapered outer edges 510a and 510b of payload 510, and help to properly position the payload beneath the UAV.

FIGS. 5A and 5B disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape. Payloads having different shapes and configurations may also be used.

Figure 11A:
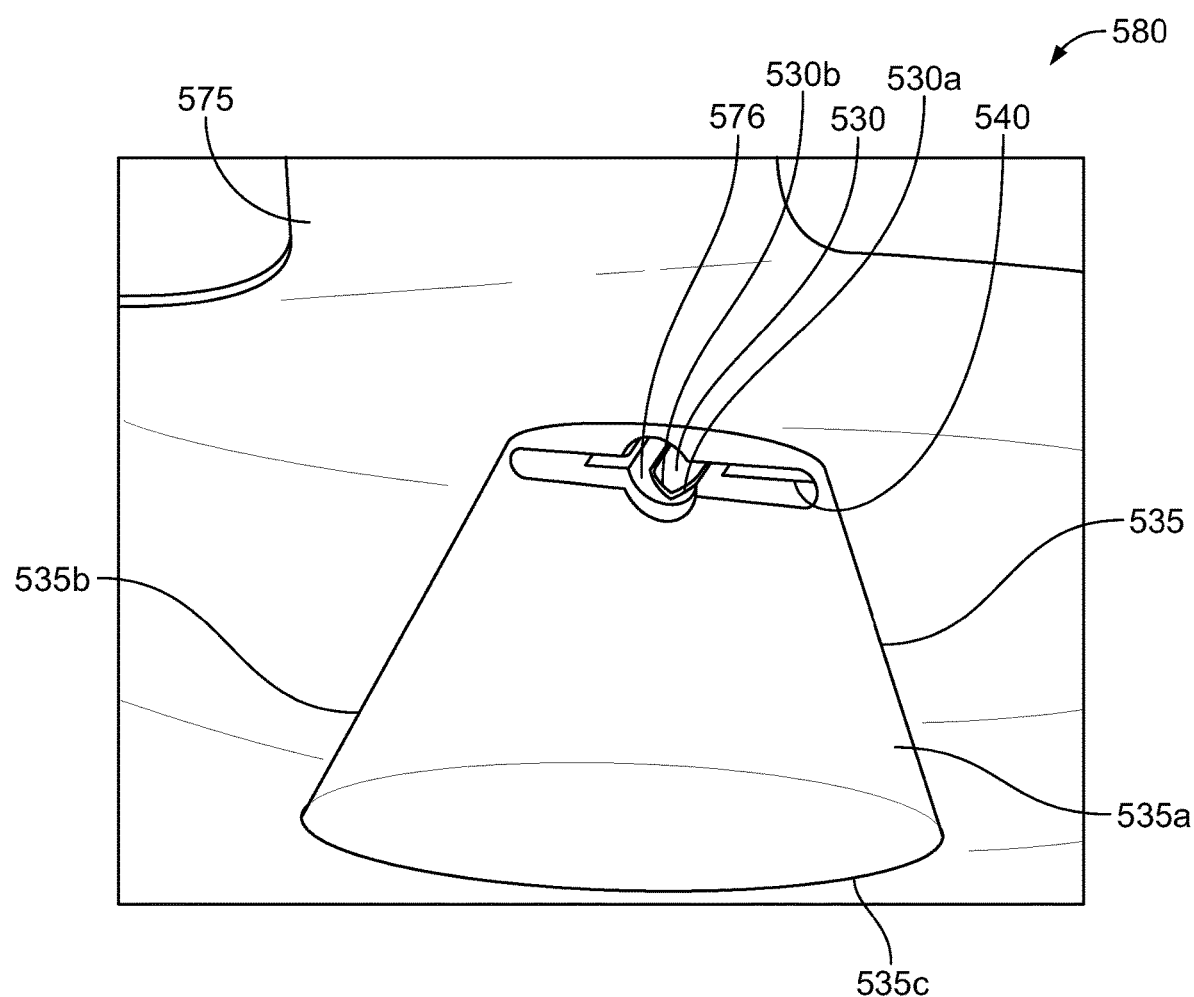
FIG. 11A is a perspective view of a recessed restraint slot 540 of a payload receptacle, and payload guiding member 535 of a UAV, according to an example embodiment.

FIG. 11A shows a perspective view of a recessed restraint slot and payload receptacle positioned in a fuselage of a UAV. In particular, payload retrieval and delivery system 580 includes a fuselage 575 having a payload receptacle 576 therein that includes inward protrusion 530 having cammed surfaces 530a and 530b that are adapted to mate with corresponding cammed surfaces on a payload coupling apparatus (not shown). Also included is a longitudinally extending recessed restraint slot 540 into which a top portion of a payload is adapted to be positioned and secured within the fuselage 575. A payload guiding member 535 extends downwardly from fuselage 575 and has a lower open end 535c that tapers inwardly towards recessed restraint slot 540 along tapered walls 535a and 535b that serve to guide an upper portion and/or or handle of a payload towards the recessed restraint slot 540.

Figure 11B:
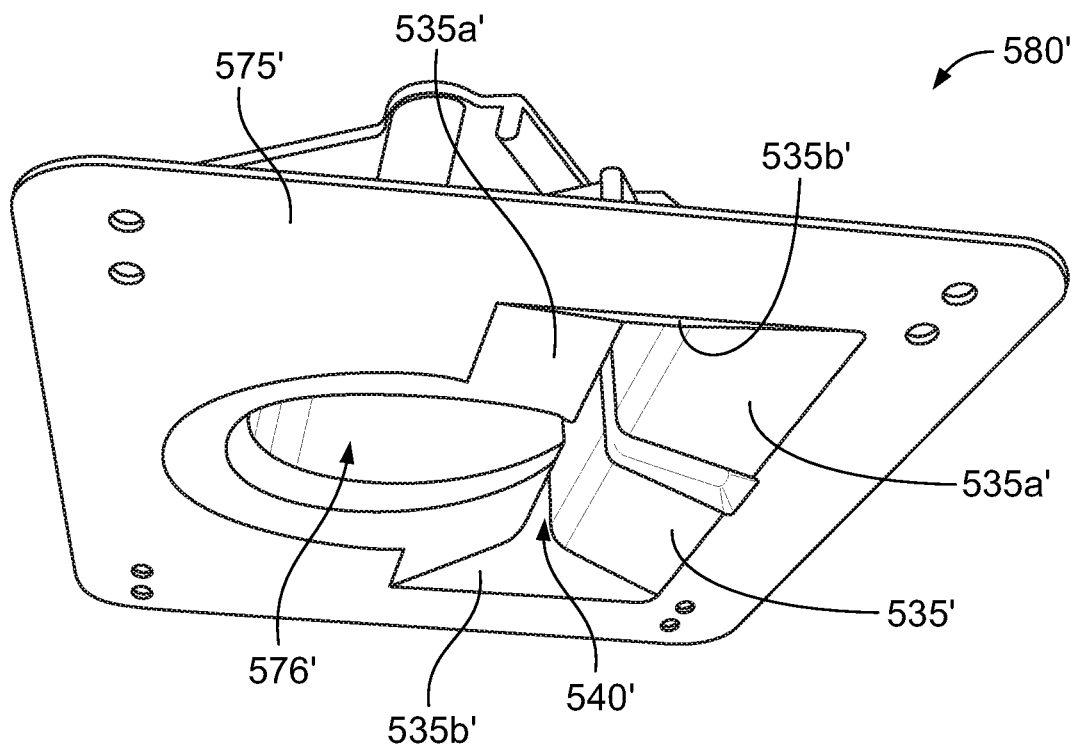
FIG. 11B is a perspective view of a recessed restraint slot 540 positioned adjacent a payload receptacle 576 having payload guiding member 535' positioned internally within payload retrieval and delivery system 580', according to an example embodiment.

Alternately, or in addition to having payload guiding member 535 shown in FIG. 11A, as shown in FIG. 11B, a payload retrieval and delivery system 580' may include a fuselage 575' having a payload receptacle 576' therein, where the payload receptacle 576' includes a longitudinally extending recessed restraint slot 540' into which a top portion of a payload is adapted to be positioned and secured within the payload retrieval and delivery system 580'. As shown in FIG. 11B, a payload guiding member 535' is shown that extends internally within the payload receptacle 576'. Payload guiding member 535' includes opposite end walls 535b', and opposed side walls 535a' which taper inwardly towards recessed restraint slot 540', and the tapered walls 535a' and 535b' serve to guide an upper portion and/or or handle of a payload towards the recessed restraint slot 540'. In addition, the payload guiding member 535 shown in FIG. 11A could be further attached beneath the payload retrieval and delivery system 580' shown in FIG. 11B to provide a combined payload guiding member that extends both internally and externally from the payload retrieval and delivery system 580'.

Figure 12A:
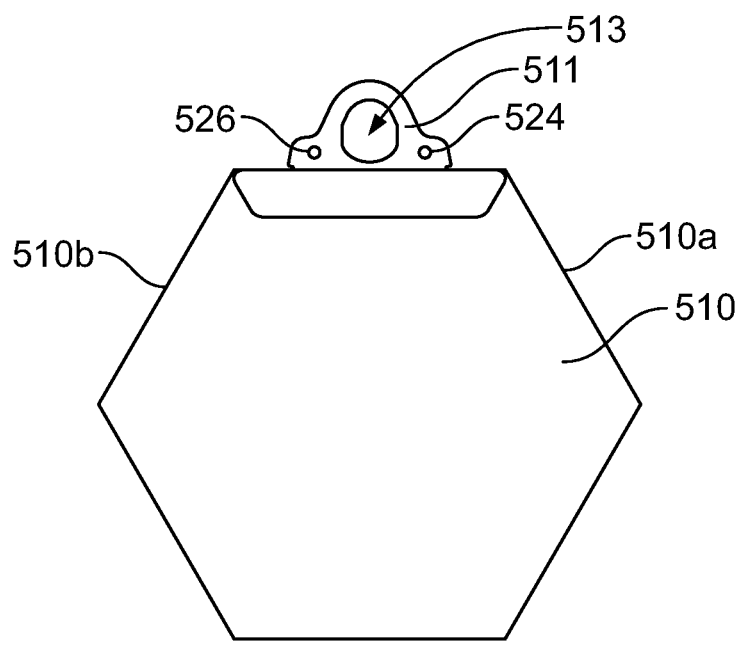
FIG. 12A is a side view of payload 510, according to an example embodiment.
Figure 12B:
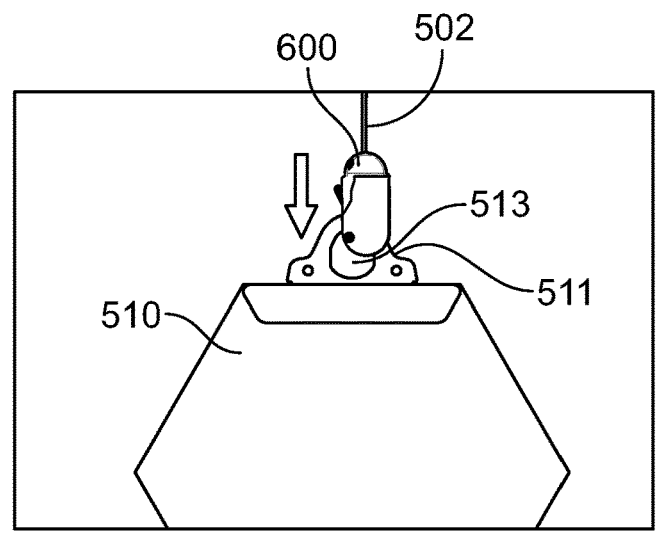
FIG. 12B shows a side view of handle 511 of payload 510 secured within a payload coupling apparatus 600 as the payload 510 moves downwardly prior to touching down for delivery.
Figure 12C:
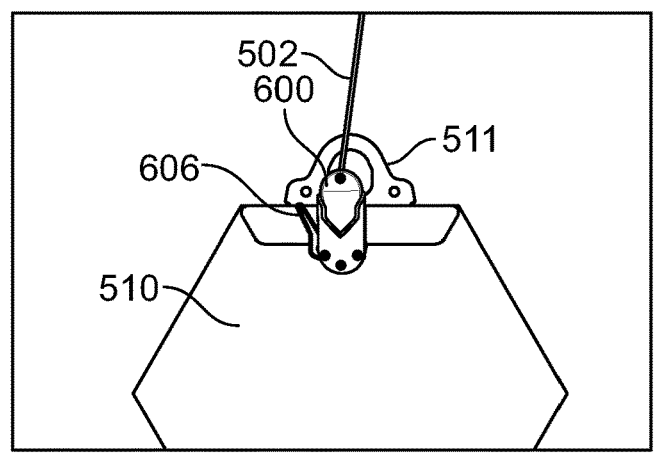
FIG. 12C shows a side view of payload 510 after payload 510 has landed on the ground showing payload coupling apparatus 600 decoupled from handle 511 of payload 510.
Figure 12D:
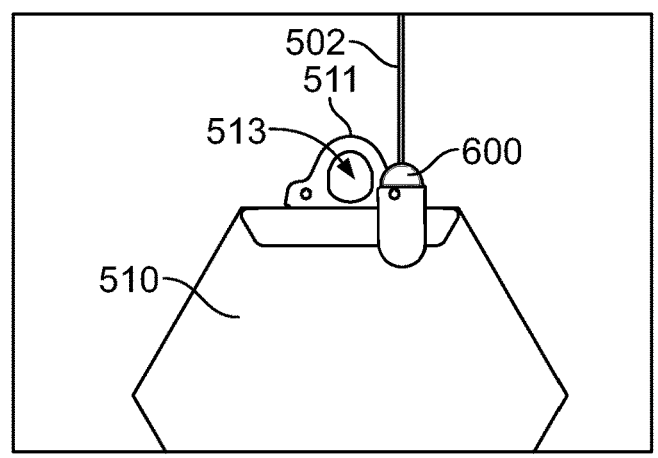
FIG. 12D shows a side view of payload 510 with payload coupling apparatus 600 moving away from handle 511 of payload 510.

FIG. 12A is a side view of payload 510 having upwardly extending sides 510a and 510b. Handle 511 is positioned at the top of payload 510, and has aperture 513 adapted for attachment to a payload coupling apparatus (not shown). Handle 511 further includes openings 524 and 526 that may be used for further securing purposes within the UAV.

FIG. 12B shows a side view of a payload 510 suspended from tether 502 with a handle 511 of payload 510 secured within a payload coupling apparatus 600 as the payload 510 moves downwardly prior to touching down for delivery. Prior to payload touchdown, the handle 511 of payload 510 includes an aperture 513 through which a swing arm or hook of payload coupling apparatus 600 extends. The payload coupling apparatus 600 is suspended from tether 502 during descent of the payload 510 to a landing site.

FIG. 12C shows a side view of payload 510 after payload 510 has landed on the ground showing payload coupling apparatus 600 decoupled from handle 511 of payload 510. Once the payload 510 touches the ground, the payload coupling apparatus 600 continues to move downwardly (as the winch further unwinds) through inertia or gravity and decouples the swing arm or hook 606 of the payload coupling apparatus 600 from handle 511 of payload 510. The payload coupling apparatus 600 remains suspended from tether 502, and can be winched back up to the payload receptacle of the UAV.

FIG. 12D shows a side view of payload 510 with payload coupling apparatus 600 moving away from handle 511 of payload 510. Here the payload coupling apparatus 600 is completely separated from the aperture 513 of handle 511 of payload 510. Tether 502 may be used to winch the payload coupling apparatus back to the payload receptacle positioned in the fuselage of the UAV.

Figure 13A:
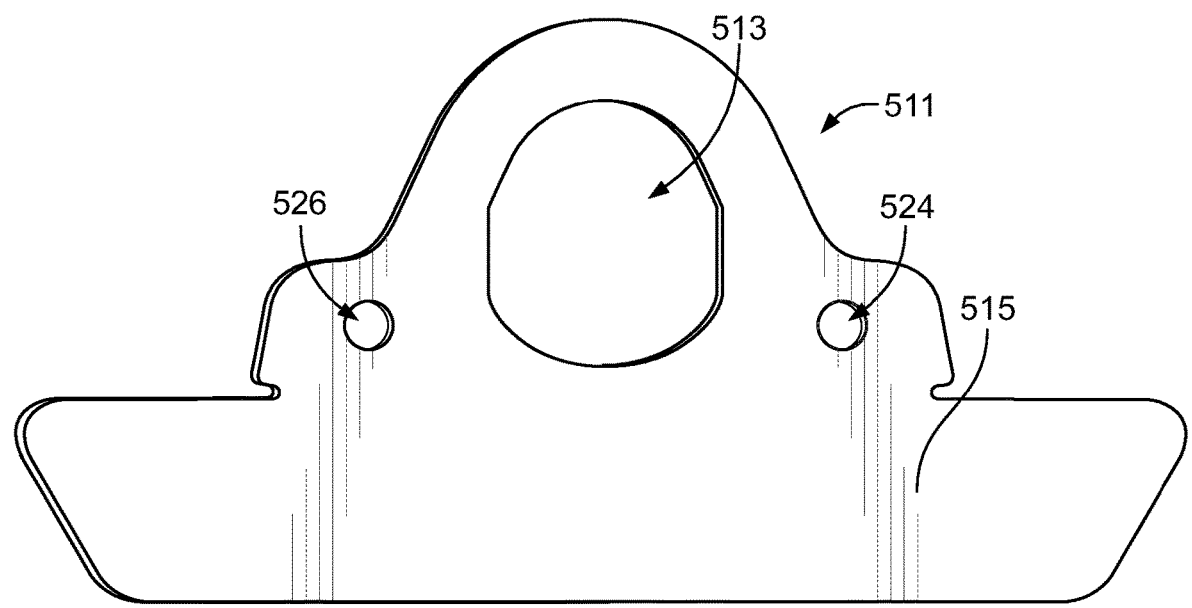
FIG. 13A is a side view of handle 511 of payload 510 having openings 524 and 526, according to an example embodiment.

FIG. 13A is a side view of handle 511 of payload 510. The handle 511 includes aperture 513 through which the swing arm or hook of a payload coupling apparatus extends through to suspend the payload during delivery, or during retrieval. The handle 511 includes a lower portion 515 that is secured to the top portion of a payload. Also included are holes 524 and 526 through which are adapted to receive locking pins positioned within the fuselage of a UAV, where the locking pins may extend to further secure the handle and payload in a secure position during high speed forward flight to a delivery location. The handle 511 may be comprised of a thin, flexible plastic material that is flexible and provides sufficient strength to suspend the payload beneath a UAV during forward flight to a delivery site, and during delivery and/or retrieval of a payload. In practice, the handle may be bent to secure the handle to a payload coupling apparatus. The handle 511 also has sufficient strength to withstand the torque during rotation of the payload coupling apparatus into the desired orientation within the payload receptacle, and rotation of the top portion of the payload into position within the recessed restraint slot (shown in FIG. 11).

Figure 13B:
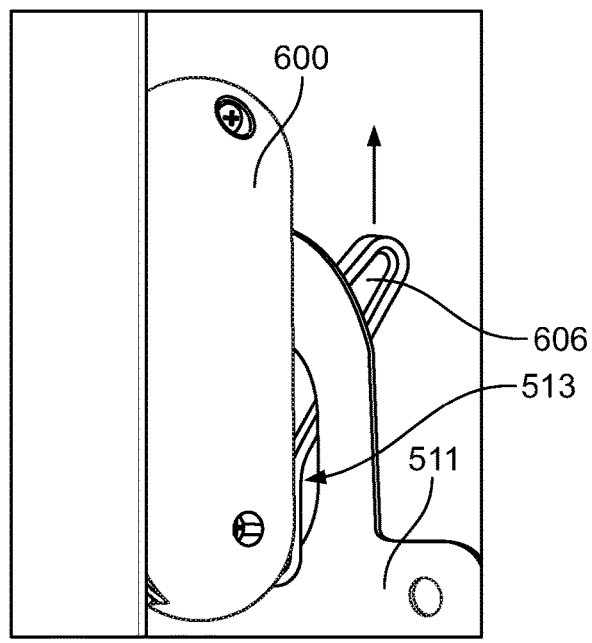
FIG. 13B is a perspective view of swing arm 606 of payload coupling apparatus 600 extending through aperture 513 of handle 511 of a payload, according to an example embodiment.

FIG. 13B is a perspective view of payload coupling apparatus 600 having swing arm 606 extending through aperture 513 of handle 511 of a payload, where swing arm 606 secures handle 511 of the payload to the payload coupling apparatus 600 during the process of retrieving the payload.

Figure 14A:
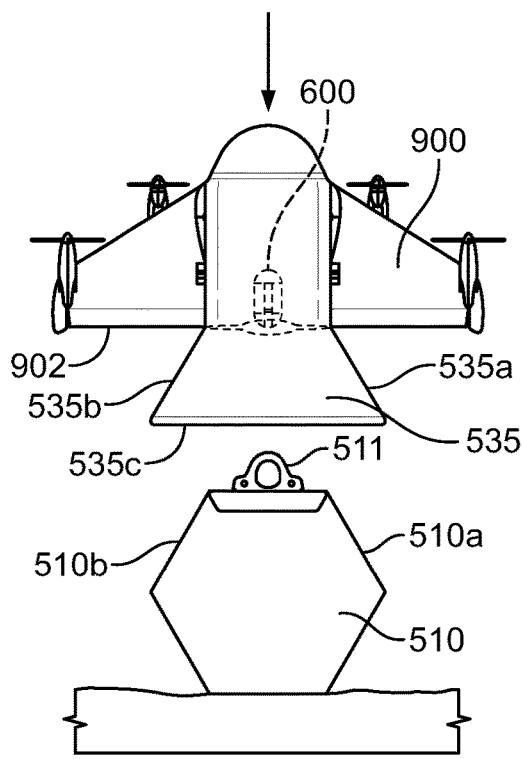
FIG. 14A is a side view of UAV 900 moving downwardly over payload 510 positioned on the ground, according to an example embodiment.

FIGS. 14A-D illustrate steps of a process of UAV 900 retrieving payload 510 that is positioned on the ground. In particular, FIG. 14A is a side view of UAV 900 moving downwardly over payload 510 to start the process of retrieving payload 510. UAV 900 includes a payload coupling apparatus 600 positioned therein, and also includes a payload guiding member 535 extending downwardly from underside 902 of UAV 900. Payload guiding member 535 includes tapered side walls 535a and 535b that taper inwardly from lower end 535c of the payload guiding member 535 towards UAV 900. Payload 510 is shown positioned on the ground. Payload 510 is configured having tapered upper walls 510a and 510b and an upwardly extending handle 511. The tapered side walls 535a and 535b of payload guiding member 535 are configured to conform to the tapered upper walls 510a and 510b of payload 510. Other configurations and geometries of payload guiding member 535 and tapered side walls 535a and 535b may be configured to operate with a payload having differently shaped upper walls 510a and 510b.

Figure 14B:
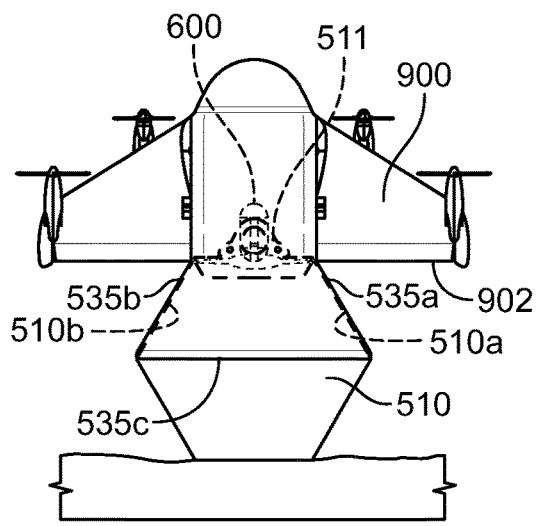
FIG. 14B is a side view of UAV 900 with payload guiding member 535 of UAV 900 lowered onto payload 510, according to an example embodiment.

FIG. 14B is a side view of UAV 900 with payload guiding member 535 of UAV 900 lowered onto payload 510 during the next step of the retrieval process. In FIG. 14B, as the UAV 900 is lowered over payload 510, the tapered side walls 535a and 535b of payload guiding member 535 have guided the handle 511 and tapered upper walls 510a and 510b until the inside of tapered side walls 535a and 535b of payload guiding member 535 closely conform to the tapered upper walls 510a and 510b of payload 510. At this point, as shown in FIG. 14B, handle 511 of payload 510 has been secured to payload coupling apparatus 600 positioned within UAV 900 in the manner described in detail above with respect to FIGS. 4A-C and 6-8.

Figure 14C:
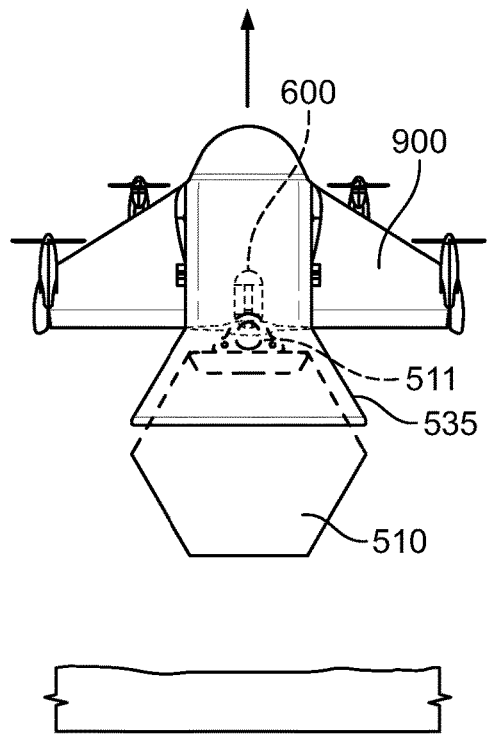
FIG. 14C is a side view of UAV 900 flying away with payload 510 positioned within payload guiding member 535 of UAV 900 and handle 511 secured to payload coupling apparatus 600 within UAV 900.

FIG. 14C is a side view of UAV 900 flying away with payload 510 positioned within payload guiding member 535 of UAV 900 and handle 511 secured to payload coupling apparatus 600 within UAV 900. In this retrieval operation shown in FIGS. 14A-C, the UAV is not required to land and the UAV 900 simply hovers over payload 510 and lowers itself onto payload 510 to secure the handle 511 of payload 510 to payload coupling apparatus 600 and then is able to fly away to a delivery site. Payload retrieval where the UAV is not required to land provides significant advantages because in some payload retrieval sites it is difficult to land the UAV because of the terrain or other obstacles on the ground. Further, in the payload retrieval operation shown in FIGS. 14A-C, payload retrieval may be done automatically without requiring human involvement in securing the payload 510 to the UAV 900 during the payload retrieval process.

FIGS. 15A-D illustrate a process of UAV 900 retrieving 510 from a payload loading apparatus 560. UAV 900 includes a payload coupling apparatus 600 positioned therein and also includes a payload guiding member 535 extending downwardly from underside 902 of UAV 900. Payload guiding member 535 includes tapered side walls 535a and 535b that taper inwardly from lower end 535c of the payload guiding member 535 towards UAV 900. FIG. 15A is a side view of UAV 900 having landed on payload loading apparatus 560 with payload 510 positioned within payload loading apparatus 560 to start the process of retrieving payload 510. In this process, as shown in FIG. 15A, lower end 535c of payload guiding member 535 is positioned on upper landing platform 562 of payload loading apparatus 560. Payload 510 is shown positioned within payload loading apparatus 560 atop loading platform 570. Payload 510 is configured having tapered upper walls 510a and 510b and an upwardly extending handle 511. The tapered side walls 535a and 535b of payload guiding member 535 are configured to conform to the tapered upper walls 510a and 510b of payload 510. Other configurations and geometries of payload guiding member 535 and tapered side walls 535a and 535b may be configured to operate with a payload having differently shaped upper walls 510a and 510b.

FIG. 15B is a side view of UAV 900 positioned on upper landing platform 562 of payload loading apparatus 560, as is shown in FIG. 15A. In FIG. 15B, loading platform 570 has been moved upwardly by platform extender 572 to move upper tapered walls 510a and 510b of payload 510 into payload guiding member 535. In FIG. 15B, as payload 510 is pushed upwardly by platform extender 572, the tapered side walls 535a and 535b of payload guiding member 535 have guided the handle 511 and tapered upper walls 510a and 510b of payload 510 towards payload coupling apparatus 600, until handle 511 of payload 510 is positioned beneath payload coupling apparatus 600.

FIG. 15C is a side view of UAV 900 as shown in FIGS. 15A and 15B, with payload 510 further pushed upwardly by platform extender 572 into payload guiding member 535 until handle 511 is engaged with payload coupling apparatus 600 during the next step of the retrieval process. In FIG. 15C, as payload 510 is pushed upwardly towards UAV 900, the tapered side walls 535a and 535b of payload guiding member 535 have guided the handle 511 and tapered upper walls 510a and 510b until the inside of tapered side walls 535a and 535b of payload guiding member 535 closely conform to the tapered upper walls 510a and 510b of payload 510. At this point, as shown in FIG. 15C, handle 511 of payload 510 has been secured to payload coupling apparatus 600 positioned within UAV 900 in the manner described in detail above with respect to FIGS. 4A-C and 6-8.

FIG. 15D is a side view of UAV 900 flying away with payload 510 positioned within payload guiding member 535 of UAV 900 and handle 511 secured to payload coupling apparatus 600 within UAV 900. In this retrieval operation shown in FIGS. 15A-D, a payload loading apparatus 560 is provided that is used to push a payload 510 into secure engagement with UAV 900. As a result, payload retrieval may be done automatically without requiring human involvement in securing the payload 510 to the UAV 900 during the payload retrieval process.

FIGS. 16A-C illustrate a process of UAV 900 retrieving 510 from a payload loading apparatus 560. UAV 900 includes a payload coupling apparatus 600 positioned therein and also includes a payload guiding member 535 extending downwardly from underside 902 of UAV 900. Payload guiding member 535 includes tapered side walls 535a and 535b that taper inwardly from lower end 535c of the payload guiding member 535 towards UAV 900. FIG. 16A is a side view of UAV 900 having landed on payload loading apparatus 560 with payload 510 positioned within payload loading apparatus 560 to start the process of retrieving payload 510. In this process, as shown in FIG. 16A, underside 902 of UAV 900 is positioned on upper landing platform 562 of payload loading apparatus 560, and payload guiding member 535 extends into the payload loading apparatus 560. Payload 510 is shown positioned within payload loading apparatus 560 atop loading platform 570. Payload 510 is configured having tapered upper walls 510a and 510b and an upwardly extending handle 511. The tapered side walls 535a and 535b of payload guiding member 535 are configured to conform to the tapered upper walls 510a and 510b of payload 510. Other configurations and geometries of payload guiding member 535 and tapered side walls 535a and 535b may be configured to operate with a payload having differently shaped upper walls 510a and 510b.

FIG. 16B is a side view of UAV 900 as shown in FIG. 16A, with payload 510 pushed upwardly by platform extender 572 into payload guiding member 535 until handle 511 is engaged with payload coupling apparatus 600 during the next step of the retrieval process. In FIG. 16B, as payload 510 is pushed upwardly towards UAV 900, the tapered side walls 535a and 535b of payload guiding member 535 have guided the handle 511 and tapered upper walls 510a and 510b until the inside of tapered side walls 535a and 535b of payload guiding member 535 closely conform to the tapered upper walls 510a and 510b of payload 510. At this point, as shown in FIG. 16B, handle 511 of payload 510 has been secured to payload coupling apparatus 600 positioned within UAV 900 in the manner described in detail above with respect to FIGS. 4A-C and 6-8.

FIG. 16C is a side view of UAV 900 flying away with payload 510 positioned within payload guiding member 535 of UAV 900 and handle 511 secured to payload coupling apparatus 600 within UAV 900. In this retrieval operation shown in FIGS. 16A-C, a payload loading apparatus 560 is provided that is used to push a payload 510 into secure engagement with UAV 900. As a result, payload retrieval may be done automatically without requiring human involvement in securing the payload 510 to the UAV 900 during the payload retrieval process.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A payload retrieval system comprising:
a UAV having a payload receptacle positioned within the UAV;
a payload coupling apparatus positioned within the payload receptacle;
a tether having a first end secured within the UAV and a second end attached to the payload coupling apparatus; and
a payload guiding member positioned in an underside of the UAV for guiding, during retrieval of a payload having tapered upper walls and an upwardly extending handle, at least part of the payload into the payload receptacle to enable the payload coupling apparatus positioned within the payload receptacle to be secured to the handle of the payload, wherein the payload guiding member includes inwardly tapered walls on an interior of the payload guiding member that are configured to conform to the tapered upper walls of the payload.

2. The payload retrieval system of claim 1, wherein the interior of the payload guiding member tapers inwardly from an open bottom end toward the payload receptacle.

3. The payload retrieval system of claim 2, wherein the payload guiding member is positioned at least in part externally from the underside of the UAV.

4. The payload retrieval system of claim 2, wherein the payload guiding member is positioned at least in part internally within the underside of the UAV.

5. The payload retrieval system of claim 1, wherein the payload coupling apparatus includes a swing arm or latch that is extendable and retractable, the swing arm or latch adapted to secure the handle of the payload within the payload receptacle.

6. The payload retrieval system of claim 5, wherein a switch or sensor is positioned within the payload receptacle operable to determine when the swing arm or latch should be extended through an aperture in the handle of the payload.

7. The payload retrieval system of claim 6, wherein the first end of the tether is secured to a winch positioned within the UAV; and wherein upon activation of the switch or sensor, the payload coupling apparatus is adapted to move upwardly by the winch, and a cam follower adjacent the payload coupling apparatus is adapted to extend the swing arm or latch through the aperture in the handle of the payload.

8. The payload retrieval system of claim 5, wherein the first end of the tether is secured to a winch positioned within the UAV, and when the winch is operated to lower the payload coupling apparatus having the swing arm or latch extended through the aperture of the handle of the payload, the swing arm or latch is adapted to automatically disengage from the handle of the payload when the payload is lowered to the ground and the payload coupling apparatus is further lowered by the winch.

9. A method of payload retrieval including the steps of:
providing a payload retrieval system comprising:
a UAV having a payload receptacle positioned within the UAV;
a payload coupling apparatus positioned within the payload receptacle;
a tether having a first end secured within the UAV and a second end attached to the payload coupling apparatus; and
a payload guiding member positioned in an underside of the UAV for guiding, during retrieval of a payload having tapered upper walls and an upwardly extending handle, at least part of the payload into the payload receptacle to enable the payload coupling apparatus positioned with the payload receptacle to be secured to the handle of the payload, wherein the payload guiding member includes inwardly tapered walls on an interior of the payload guiding member that are configured to conform to the tapered upper walls of the payload; positioning the UAV over the payload;
lowering the UAV until a portion of the handle of the payload is positioned within the payload guiding member;
guiding the handle of the payload with the payload guiding member towards the payload receptacle;
further lowering the UAV until the portion of the handle of the payload is in a desired position within the payload receptacle;
securing the handle of the payload to the payload coupling apparatus within the payload receptacle; and
flying the UAV with the payload secured within the payload receptacle.

10. The method of claim 9, wherein the payload coupling apparatus includes a swing arm or latch that is extendable and retractable, and the step of securing the handle of the payload to the payload coupling apparatus includes moving the swing arm or latch through an aperture of the handle to secure the payload within the payload receptacle.

11. The method of claim 10, wherein the step of securing the handle of the payload to the payload coupling apparatus involves having a portion of the handle above the aperture in the handle force the swing or latch inwardly until the portion of the handle above the aperture moves past the swing arm or latch and the swing arm or latch is extended through the aperture in the handle of the payload.

12. The method of claim 10, wherein a switch or sensor is positioned within the payload receptacle that is triggered to cause the swing arm or latch to extend through the aperture in the handle of the payload, and wherein upon activation of the switch or sensor, the payload coupling apparatus is moved upwardly with a winch positioned in the UAV, and a cam follower adjacent the payload coupling apparatus causes the swing arm or latch to extend through the aperture in the handle of the payload, as the payload coupling apparatus is moved upwardly by the winch.

13. The method of claim 10, wherein the first end of the tether is secured to a winch positioned within the UAV, and further including the step of delivering the payload at a payload delivery site wherein the winch is operated to lower the payload coupling apparatus having the swing arm or latch extended through the aperture of the handle of the payload, and the swing arm or latch automatically disengages from the handle of the payload when the payload is lowered to the ground and the payload coupling apparatus is further lowered by the winch.

14. A method of payload retrieval including the steps of:
providing a payload retrieval system comprising:
a UAV having a payload receptacle positioned within the UAV;
a payload coupling apparatus positioned within the payload receptacle;
a tether having a first end secured within the UAV and a second end attached to the payload coupling apparatus; and
a payload guiding member positioned in an underside of the UAV for guiding, during retrieval of a payload having tapered upper walls and an upwardly extending handle, at least a portion of the payload into the payload receptacle to enable the payload coupling apparatus positioned within the payload receptacle to be secured to the handle of the payload, wherein the payload guiding member includes inwardly tapered walls on an interior of the payload guiding member that are configured to conform to the tapered upper walls of the payload;
landing the UAV on a payload loading apparatus at a payload retrieval site, where the payload is positioned beneath the UAV;
pushing the payload upwardly until the handle of the payload is positioned within the payload guiding member;
guiding the handle of the payload with the payload guiding member towards the payload receptacle;
further pushing the payload upwardly until the handle of the payload is in a desired position within the payload receptacle;
securing the handle of the payload to the payload coupling apparatus within the payload receptacle; and
flying the UAV with the payload secured within the payload receptacle from the payload retrieval site.

15. The method of claim 14, wherein upon landing the UAV on the payload loading apparatus the payload guiding member is positioned within the payload loading apparatus.

16. The method of claim 14, wherein the payload coupling apparatus includes a swing arm or latch that is extendable and retractable, and the step of securing the handle of the payload to the payload coupling apparatus includes moving the swing arm or latch through an aperture of the handle to secure the payload within the payload receptacle.

17. The method of claim 16, the step of securing the handle of the payload to the payload coupling apparatus involves having a portion of the handle above the aperture in the handle force the swing or latch inwardly until the portion of the handle above the aperture moves past the swing arm or latch and the swing arm or latch is extended through the aperture in the handle of the payload.

18. The method of claim 16, wherein a switch or sensor is positioned within the payload receptacle that is triggered to cause the swing arm or latch to extend through the aperture in the handle of the payload, wherein upon activation of the switch or sensor, the payload coupling apparatus is moved upwardly with a winch positioned in the UAV, and a cam follower adjacent the payload coupling apparatus causes the swing arm or latch to extend through the aperture in the handle of the payload, as the payload coupling apparatus is moved upwardly by the winch.

19. The method of claim 16, wherein the first end of the tether is secured to a winch positioned within the UAV, and further including the step of delivering the payload at a payload delivery site wherein the winch is operated to lower the payload coupling apparatus having the swing arm or latch extended through the aperture of the handle of the payload, and the swing arm or latch automatically disengages from the handle of the payload when the payload is lowered to the ground and the payload coupling apparatus is further lowered by the winch.

20. The method of claim 14, wherein the step of guiding the handle toward the payload receptacle includes engaging tapered upper sides of the payload with inwardly tapered walls on the interior of the payload guiding member.

* * * * *